(12) United States Patent
Tanaka

(10) Patent No.: US 10,668,380 B2
(45) Date of Patent: Jun. 2, 2020

(54) NON-TRANSITORY STORAGE MEDIUM HAVING STORED THEREIN INFORMATION PROCESSING PROGRAM, INFORMATION PROCESSING APPARATUS, INFORMATION PROCESSING METHOD, AND INFORMATION PROCESSING SYSTEM

(71) Applicant: NINTENDO CO., LTD., Kyoto (JP)

(72) Inventor: Wataru Tanaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 166 days.

(21) Appl. No.: 15/945,919

(22) Filed: Apr. 5, 2018

(65) Prior Publication Data

US 2018/0339230 A1    Nov. 29, 2018

(30) Foreign Application Priority Data

May 23, 2017  (JP) ................. 2017-101410

(51) Int. Cl.
*A63F 13/5378* (2014.01)
*A63F 13/422* (2014.01)
*A63F 13/5258* (2014.01)
*A63F 13/55* (2014.01)
*A63F 13/58* (2014.01)
*A63F 13/92* (2014.01)

(52) U.S. Cl.
CPC ........ *A63F 13/5378* (2014.09); *A63F 13/422* (2014.09); *A63F 13/5258* (2014.09); *A63F 13/55* (2014.09); *A63F 13/58* (2014.09); *A63F 13/92* (2014.09)

(58) Field of Classification Search
CPC ........ A63F 13/04; A63F 13/56; A63F 13/803; A63F 13/837
See application file for complete search history.

(56) References Cited

U.S. PATENT DOCUMENTS

| | | |
|---|---|---|
| 2001/0044334 A1 | 11/2001 | Kuri |
| 2003/0144045 A1 | 7/2003 | Fujita |
| 2010/0248804 A1 | 9/2010 | Matsumaru |
| 2011/0245942 A1* | 10/2011 | Yamamoto ............ A63F 13/803 700/91 |
| 2012/0115596 A1 | 5/2012 | Otani |
| 2014/0113721 A1* | 4/2014 | Sitnikov ............... A63F 13/803 463/31 |

FOREIGN PATENT DOCUMENTS

JP    2001-327751    11/2001

OTHER PUBLICATIONS

Extended European Search Report, issued in corresponding EP Application No. 18168518.1, dated Jun. 14, 2018 (7 pages).

* cited by examiner

*Primary Examiner* — Reginald A Renwick
(74) *Attorney, Agent, or Firm* — Nixon & Vanderhye PC

(57) ABSTRACT

A game system (1) includes a player object state determination unit (721) that determines the state of a player object in a virtual space, a search range determination unit (722) that determines a search range for searching for a non-player object based on the state of the player object, a target-object presence determination unit (723) that determines whether the non-player object is present in the search range, and a target-object setting unit (724) that sets the non-player object as a target of a cap throwing process if it is determined that the non-player object is present in the search range.

32 Claims, 21 Drawing Sheets

NON-TRANSITORY STORAGE MEDIUM HAVING STORED THEREIN INFORMATION PROCESSING PROGRAM, INFORMATION PROCESSING APPARATUS, INFORMATION PROCESSING METHOD, AND INFORMATION PROCESSING SYSTEM

CROSS REFERENCE TO RELATED APPLICATION

This non-provisional application is based on Japanese Patent Application No. 2017-101410 filed with the Japan Patent Office on May 23, 2017, the entire contents of which are hereby incorporated by reference.

FIELD

The present disclosure relates to a non-transitory storage medium having stored therein an information processing program that performs information processing on an object in a virtual space, an information processing apparatus, an information processing method, and an information processing system.

BACKGROUND AND SUMMARY

There has been known an information processing apparatus that provides a virtual space and launches an object from a player object set in the virtual space according to an operation of a player. When the object is launched from the player object to a non-player object in the information processing apparatus, if the object is always launched in the front direction of the player object, the object needs to be launched in a state where the front direction of the player object is directed to the direction in which the non-player object is present. Such a directional adjustment of the player object is not easy.

There has been known a player assist function that performs information processing that determines whether a non-player object is present in a predetermined search range in a virtual space and launches an object to the non-player object present in the search range, which is a target. For example, there has been known an information processing apparatus in which in a virtual space where a player object and a non-player object are present, when the non-player object is present in a search range determined by using the location of the player object as a reference, an object is launched from the player object to the non-player object based on an operation of a player.

As an example of such an information processing apparatus, an information processing apparatus that performs a soccer game is disclosed in the prior art disclosed in JP 2001-327751 A. In the soccer game of the prior art, an object having a ball object is set as a player object operated by a player. When an object of the same team is present in a predetermined angular range about the front direction of the player object, the ball object is moved from the player object to the object of the same team according to an input of a ball pass operation by the player.

In the information processing apparatus of the prior art, when a button is strongly pressed in the ball pass operation, the angle of the predetermined angular range is reduced. Consequently, when the button is strongly pressed in the ball pass operation, the ball can be passed to a player object of the same team that is present substantially in the front direction of the player object even if the player object is far away from the player object of the same team. Meanwhile, when the button is weakly pressed in the ball pass operation, the ball can be passed to a player object of the same team near the player object even if the player object of the same team is present in a relatively shifted manner from the front direction of the player object.

In the information processing apparatus of the prior art, however, to move the ball object to an intended target, it is necessary for the player to distinguish operations (distinguish between strong pressing and weak pressing).

An object of the present disclosure is to provide an information processing apparatus and the like that achieve a player assist function that enables a player to naturally set a target of information processing without being conscious to distinguish operations.

A non-transitory storage medium storing an information processing program for controlling at least one processor, wherein the information processing program when executed by the at least one processor causes the at least one processor to: determine a state of a first object in a virtual space; determine a search range for searching for a second object based on a state of the first object; search for whether the second object is present in the search range; and set the second object as a target of predetermined information processing when it is determined that the second object is present in the search range.

With this configuration, the search range for searching for the second object is determined based on the state of the first object and the target of the information processing is set. It is thus possible to provide a player assist function that enables a player to set the target of the information processing without being conscious to distinguish operations.

In the non-transitory storage medium described above, the information processing program may further cause the at least one processor to determine magnitude of a movement input to the first object as a state of the first object.

With this configuration, the search range determination means determines the search range based on the magnitude of a movement input to the first object.

In the non-transitory storage medium described above, the information processing program may further cause the at least one processor to determine magnitude of a positional change of the first object as a state of the first object.

With this configuration, the search range determination means determines the search range based on the magnitude of a positional change of the first object.

In the non-transitory storage medium described above, the information processing program may further cause the at least one processor to determine the search range so as to be continuously or discretely increased as the movement input is smaller.

With this configuration, the search range is determined so as to be continuously or discretely increased as the movement input to the first object is smaller. When the search range determination means determines the search range so as to be discretely increased as the movement input is smaller, the search range determination means may execute two-stage control. In the two-stage control, when there is a movement input to the player object (or when a movement input is equal to or larger than a predetermined threshold), the search range determination unit may set the size of the search range to a first size. When there is no movement input to the player object (or when a movement input is less than a predetermined threshold), the search range determination unit may set the size of the search range to a second size larger than the first size.

In the non-transitory storage medium described above, the information processing program may further cause the at least one processor to determine the search range so as to be continuously or discretely increased as the positional change is smaller.

With this configuration, the search range is determined so as to be continuously or discretely increased as the positional change of the first object is smaller. When the search range determination means determines the search range so as to be discretely increased as the positional change of the first object is smaller, the search range determination means may execute two-stage control. In the two-stage control, when there is a positional change of the first object (or when a positional change is equal to or larger than a predetermined threshold), the search range determination unit may set the size of the search range to a first size. When there is no positional change of the first object (or when a positional change is less than a predetermined threshold), the search range determination unit may set the size of the search range to a second size larger than the first size.

In the non-transitory storage medium described above, the information processing program may further cause the at least one processor to determine magnitude of a change in directional input to the first object as a state of the first object.

With this configuration, the search range determination means determines the search range based on the magnitude of a change in directional input to the first object.

In the non-transitory storage medium described above, the information processing program may further cause the at least one processor to determine magnitude of a directional change of the first object as a state of the first object.

With this configuration, the search range determination means determines the search range based on the magnitude of a directional change of the first object.

In the non-transitory storage medium described above, the information processing program may further cause the at least one processor to determine the search range so as to be continuously or discretely increased as the change in directional input is larger.

With this configuration, the search range is determined so as to be continuously or discretely increased as the change in directional input to the first object is larger. When the search range determination means determines the search range so as to be discretely increased as the change in directional input to the first object is larger, the search range determination means may execute two-stage control. In the two-stage control, when there is no change in directional input to the first object (or when a change in directional input is equal to or less than a predetermined threshold), the search range determination unit may set the size of the search range to a first size. When there is a change in directional input to the first object (or when a change in directional input is larger than a predetermined threshold), the search range determination unit may set the size of the search range to a second size larger than the first size.

In the non-transitory storage medium described above, the information processing program may further cause the at least one processor to determine the search range so as to be continuously or discretely increased as the directional change is larger.

With this configuration, the search range is determined so as to be continuously or discretely increased as the directional change of the first object is larger. When the search range determination means determines the search range so as to be discretely increased as the directional change of the first object is larger, the search range determination means may execute two-stage control. In the two-stage control, when there is no directional change of the first object (or when a directional change is equal to or less than a predetermined threshold), the search range determination unit may set the size of the search range to a first size. When there is a directional change of the first object (or when a directional change is larger than a predetermined threshold), the search range determination unit may set the size of the search range to a second size larger than the first size.

In the non-transitory storage medium described above, the information processing program may further cause the at least one processor to, when it is determined that a plurality of the second objects are present in the search range, set the second object that satisfies a predetermined condition as a target of the information processing.

With this configuration, when the second objects are present in the search range, only a part of the second objects may be set as the target of the information processing.

In the non-transitory storage medium described above, the predetermined condition may be at least a condition based on whether a distance to an imaginary line extending in a front direction of the first object is short.

With this configuration, the second object functioning as the target of the information processing may be set based on the direction of the first object.

In the non-transitory storage medium described above, the information processing program may further cause the at least one processor to determine the search range by using a position and a direction of the first object as a reference.

With this configuration, the search range may be set by using the first object as a reference.

In the non-transitory storage medium described above, the search range is a sector in which a center may be at the first object and a center line of a central angle is a front direction of the first object, and the information processing program may further cause the at least one processor to determine the search range by determining at least one of the central angle of the sector and a radius of the sector based on a state of the first object.

With this configuration, the size of the sector-shaped search range is adjusted based on the state of the first object.

In the non-transitory storage medium described above, the information processing program may further cause the at least one processor to, when it is determined that an input for performing the predetermined information processing is made, determine the search range.

With this configuration, the search range is determined when an instruction to perform the information processing is made, that is, when the second object needs to be searched for.

In the non-transitory storage medium described above, the information processing program may further cause the at least one processor to perform information processing of launching a third object from the first object to the target as the predetermined information processing.

With this configuration, it is possible to launch the third object to the second object that is present in the search range determined based on the state of the first object.

In the non-transitory storage medium described above, the information processing program may further cause the at least one processor to, when it is determined that the second object is not present in the search range, launch the third object in a front direction of the first object.

With this configuration, when the second object functioning as the target of the information processing is not present, it is possible to launch the third object in the front direction of the first object.

In the non-transitory storage medium described above, the information processing program may further cause the at least one processor to, when it is determined that an input for changing a course of the third object having been launched is made, set a position of the third object as a reference and determines the search range according to the input for changing the course.

With this configuration, the search range is determined based on the input for changing the course of the third object having been launched.

In the non-transitory storage medium described above, the first object may be a player object that is operated by a player.

With this configuration, the second object functioning as the target of the predetermined information processing can be searched for based on the state of the player object.

In the non-transitory storage medium described above, the first object may be a player object that is operated by a player, and the information processing program may further cause the at least one processor to change an object functioning as a player object from the first object to the second object determined as the target after the predetermined information processing.

With this configuration, it is possible to achieve a game effect in which the second object determined as the target is possessed by the player object.

An information processing apparatus comprising at least one processor, the at least one processor configured to: determine a state of a first object in a virtual space; determine a search range for searching for a second object based on a state of the first object; search for whether the second object is present in the search range; and set the second object as a target of predetermined information processing when it is determined that the second object is present in the search range.

With this configuration, the search range for searching for the second object is determined based on the state of the first object and the target of the information processing is set. It is thus possible to provide a player assist function that enables a player to set the target of the information processing without being conscious to distinguish operations.

An information processing method comprising: determining a state of a first object in a virtual space; determining a search range for searching for a second object based on a state of the first object; searching for whether the second object is present in the search range; and setting the second object as a target of predetermined information processing when it is determined that the second object is present in the search range.

With this configuration, the search range for searching for the second object is determined based on the state of the first object and the target of the information processing is set. It is thus possible to provide a player assist function that enables a player to set the target of the information processing without being conscious to distinguish operations.

An information processing system comprising at least one processor, the at least one processor configured to: determine a state of a first object in a virtual space; determine a search range for searching for a second object based on a state of the first object; search for whether the second object is present in the search range; and set the second object as a target of predetermined information processing when it is determined that the second object is present in the search range.

With this configuration, the search range for searching for the second object is determined based on the state of the first object and the target of the information processing is set. It is thus possible to provide a player assist function that enables a player to set the target of the information processing without being conscious to distinguish operations.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

An embodiment of the present disclosure is described below with reference to the drawings. The embodiment described below is intended to show an example when implementing the present disclosure, and is not intended to limit the present disclosure to a specific configuration described below. When implementing the present disclosure, a specific configuration may be appropriately employed according to the embodiment. An example of configuring an information processing system as a game system is described below.

Hereinafter, a game system according to an example of the present embodiment will be described. An example of a game system 1 in the present embodiment includes a main body apparatus (information processing apparatus, functioning as a game apparatus main body in the present embodiment) 2, a left controller 3, and a right controller 4. The left controller 3 and the right controller 4 are individually detachable from the main body apparatus 2. Specifically, it is possible to use as an integrated apparatus by attaching each of the left controller 3 and the right controller 4 to the main body apparatus 2. Moreover, the main body apparatus 2 and the left controller 3 and the right controller 4 can be used separately (refer to FIG. 2). In the following, a hardware configuration of the game system according to the present embodiment will be described first, and the control of the game system of the present embodiment will then be described.

Figure 1:
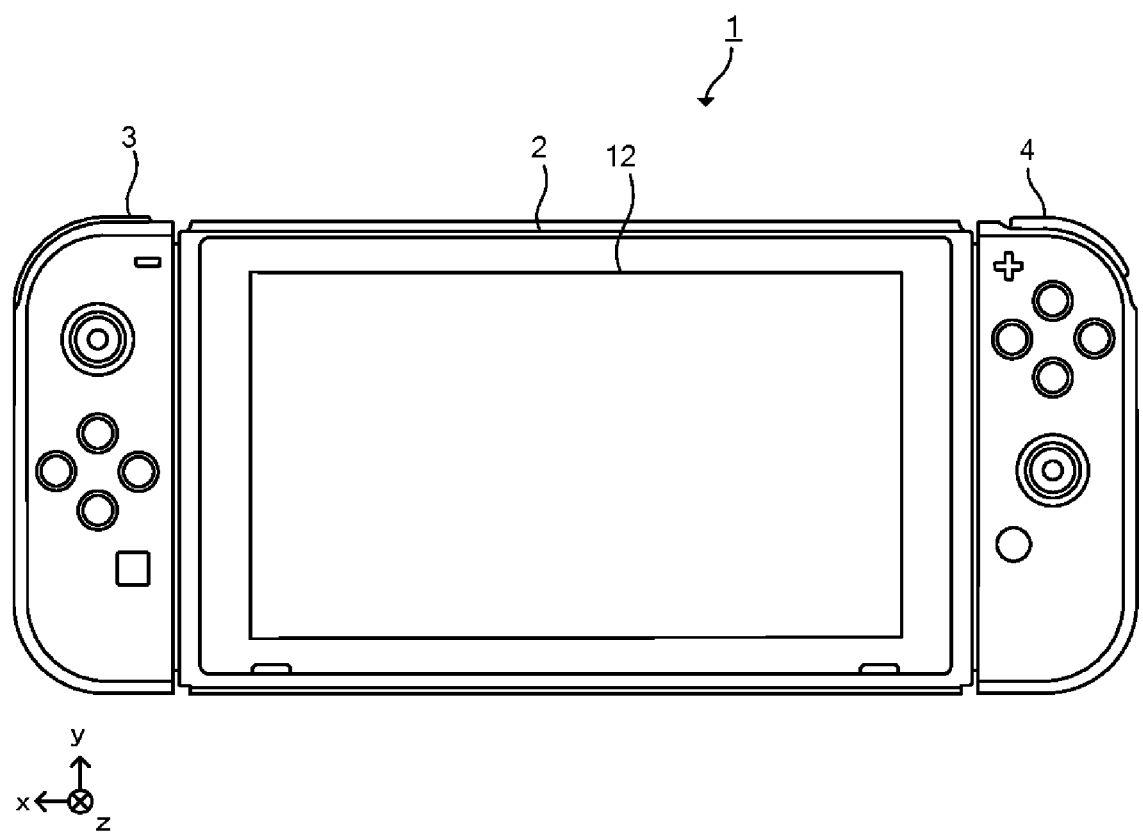
FIG. 1 shows an example of a state where a left controller and a right controller are attached to a main body apparatus.

FIG. 1 is a diagram illustrating an example of a state in which the left controller 3 and the right controller 4 are attached to the main body apparatus 2. As illustrated in FIG. 1, the left controller 3 and the right controller 4 are attached to and integrated with the main body apparatus 2. The main body apparatus 2 is an apparatus configured to execute various types of processing (for example, game processing) in the game system 1. The main body apparatus 2 includes a display 12. Each of the left controller 3 and the right controller 4 is an apparatus including an operation unit used by a user to perform input.

Figure 2:
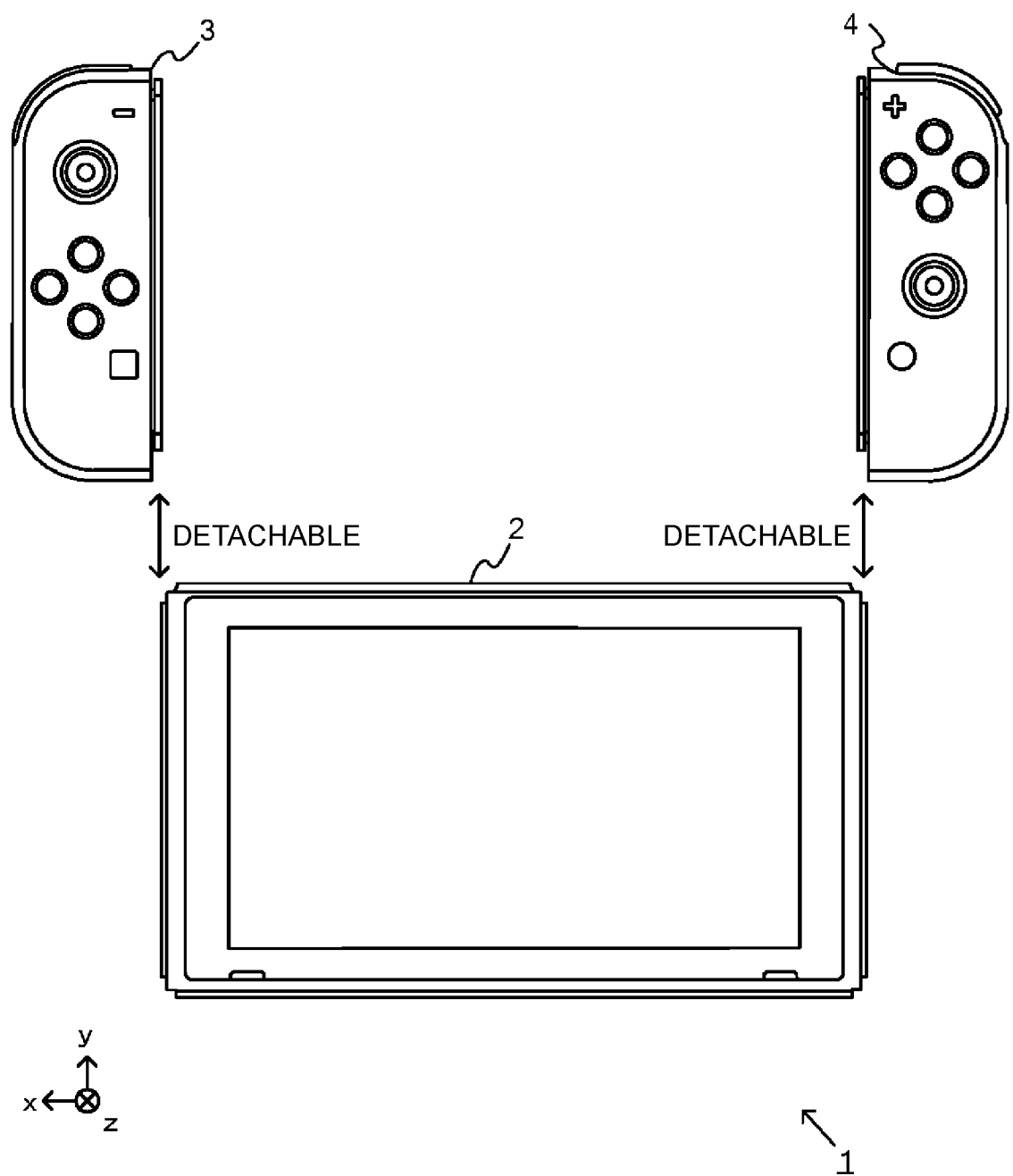
FIG. 2 shows an example of a state where the left controller and the right controller are removed from the main body apparatus.

FIG. 2 is a diagram illustrating an exemplary state in which the left controller 3 and the right controller 4 are removed from the main body apparatus 2. As illustrated in FIGS. 1 and 2, the left controller 3 and the right controller 4 are detachable from the main body apparatus 2. In the following description, the left controller 3 and the right controller 4 will be collectively referred to as the "controller" in some cases.

Figure 3:
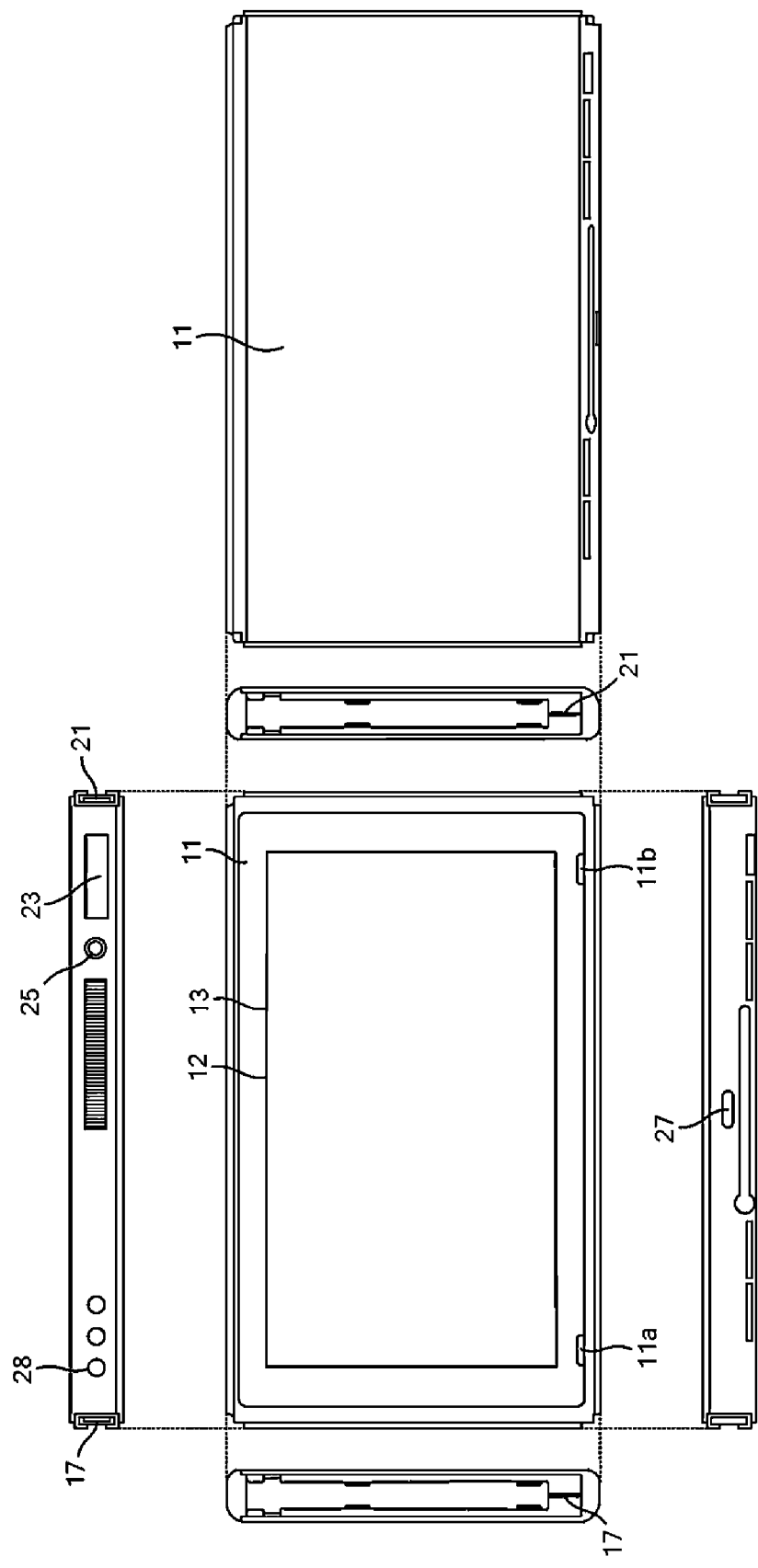
FIG. 3 is a six-sided view showing an example of the main body apparatus.

FIG. 3 is a six-sided view illustrating an example of the main body apparatus 2. As illustrated in FIG. 3, the main body apparatus 2 includes a substantially plate-like housing 11. In the present embodiment, a main surface of the housing 11 (in other words, a front-side surface, that is, the surface on which the display 12 is provided) is substantially rectangular in shape.

The shape and size of the housing 11 are arbitrary. For example, the housing 11 may be formed in a mobile size. Moreover, the main body apparatus 2 alone and the integrated apparatus in which the left controller 3 and the right controller 4 are attached to the main body apparatus 2 may be a mobile apparatus. The main body apparatus 2 or the integrated apparatus may be a handheld apparatus. Alternatively, the main body apparatus 2 or the integrated apparatus may be a portable apparatus.

As illustrated in FIG. 3, the main body apparatus 2 includes a display 12 provided on the main surface of the housing 11. The display 12 displays an image generated by the main body apparatus 2. In the present embodiment, the display 12 is a liquid crystal display (LCD). Note that the display 12 may be any type of display apparatus.

The main body apparatus 2 includes a touch panel 13 on a screen of the display 12. In the present embodiment, the touch panel 13 uses a system capable of multi-touch input (for example, capacitance system). Note that the touch panel 13 may use any system, for example, a system capable of single touch input (for example, resistive film system).

The main body apparatus 2 includes a speaker (that is, a speaker 88 illustrated in FIG. 6) inside the housing 11. As illustrated in FIG. 3, speaker holes 11a and 11b are formed on the main surface of the housing 11. The output sound of the speaker 88 is output from each of the speaker holes 11a and 11b.

Moreover, the main body apparatus 2 includes a left side terminal 17 as a terminal used by the main body apparatus 2 to perform wired communication with the left controller 3, and a right side terminal 21 used by the main body apparatus 2 to perform wired communication with the right controller 4.

As illustrated in FIG. 3, the main body apparatus 2 includes a slot 23. The slot 23 is provided on the upper side surface of the housing 11. The slot 23 has a shape that enables a predetermined type of storage medium to be attached. The predetermined type of storage medium is, for example, a storage medium (for example, a dedicated memory card) dedicated to the game system 1 and the information processing apparatus of the same type as the game system 1. The predetermined type of storage medium is used for storing, for example, one or both of the data (for example, saved data of an application) used in the main body apparatus 2 and a program (for example, an application program) executed in the main body apparatus 2. Moreover, the main body apparatus 2 includes a power button 28.

The main body apparatus 2 includes a lower terminal 27. The lower terminal 27 is a terminal used by the main body apparatus 2 to communicate with a cradle. In the present embodiment, the lower terminal 27 is a USB connector (more specifically, a female connector). When the integrated apparatus or the main body apparatus 2 alone is mounted on the cradle, the game system 1 can display an image generated and output by the main body apparatus 2, on the stationary monitor. Moreover, in the present embodiment, the cradle has a function of charging the above-described integrated apparatus or the main body apparatus 2 alone mounted on the cradle. The cradle also has a function of a hub apparatus (specifically, a USB hub).

Figure 4:
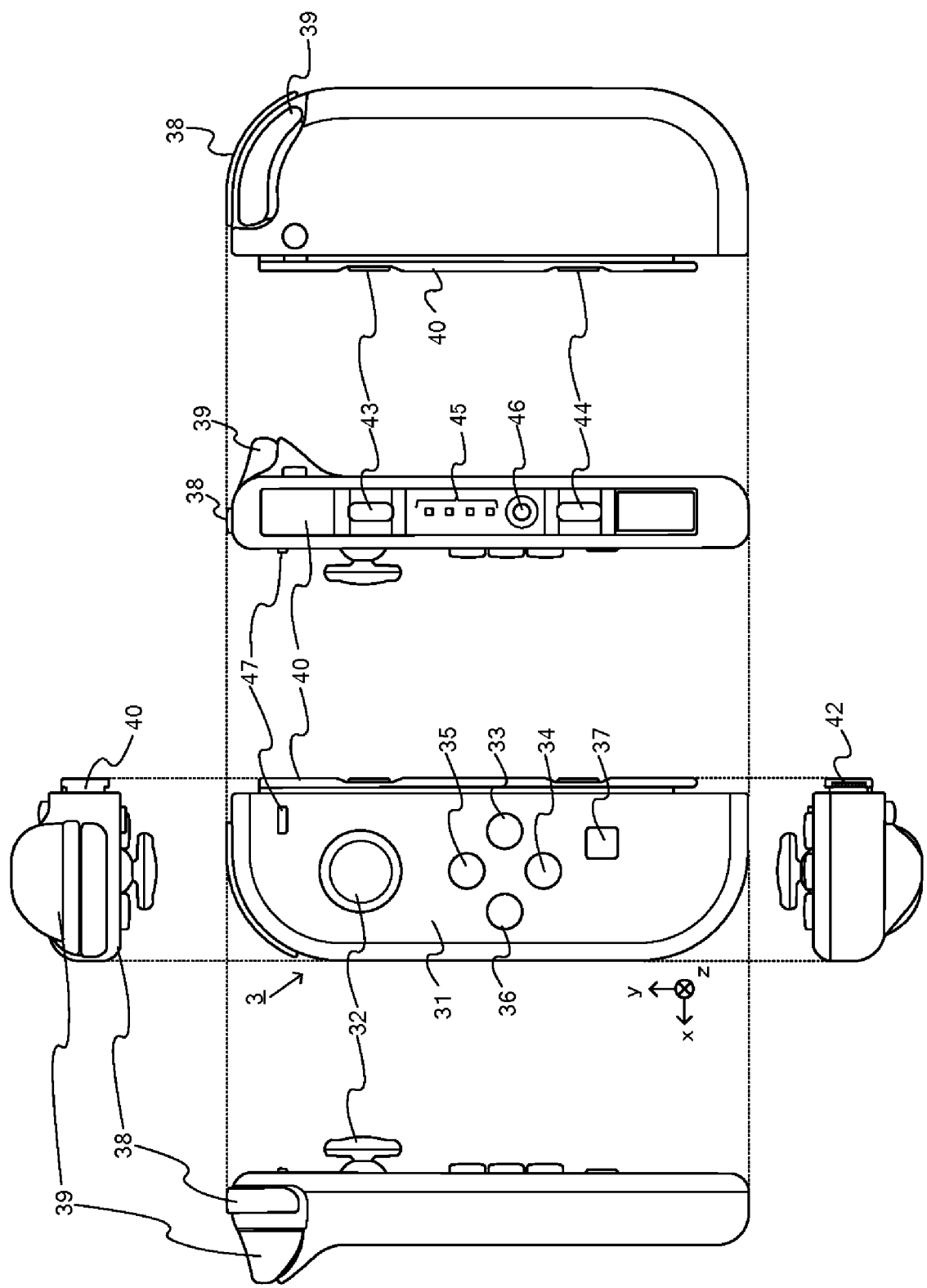
FIG. 4 is a six-sided view showing an example of the left controller.

FIG. 4 is a six-sided view illustrating an example of the left controller 3. As illustrated in FIG. 4, the left controller 3 includes a housing 31. In the present embodiment, the housing 31 has a vertically long shape, that is, a long shape in the vertical direction (that is, in the y-axis direction illustrated in FIGS. 1 and 4). The left controller 3 can also be held in a vertically long orientation in a state detached from the main body apparatus 2. The housing 31 has a shape and size that can be held with one hand, in particular with the left hand, in a case of being held in a vertically long orientation. Moreover, the left controller 3 can also be held in a landscape orientation. In the case where the left controller 3 is held in a landscape orientation, it may be held with both hands.

The left controller 3 includes an analog stick 32. As illustrated in FIG. 4, the analog stick 32 is provided on the main surface of the housing 31. The analog stick 32 can be used as a direction input unit capable of inputting a direction. By inclining the analog stick 32, the user can input a direction corresponding to the inclination direction (and input with a size corresponding to the inclined angle). Instead of the analog stick, the left controller 3 may be provided with a cross key or a slide stick capable of slide input as the direction input unit. Moreover, an input by pressing the analog stick 32 is possible in the present embodiment.

The left controller 3 includes various operation buttons. First, the left controller 3 includes four operation buttons 33 to 36 (specifically, a right direction button 33, a down direction button 34, an up direction button 35, and a left direction button 36) on the main surface of the housing 31. Furthermore, the left controller 3 includes a recording button 37 and a − (minus sign) button 47. The left controller 3 includes a first L button 38 and a ZL button 39 on the upper left of the side surface of the housing 31. The left controller 3 also includes a second L button 43 and a second R button 44 on the side surface of the housing 31, the side to be attached when it is attached to the main body apparatus 2. These operation buttons are used to give instructions according to various programs (for example, OS program and application program) executed by the main body apparatus 2.

Moreover, the left controller 3 includes a terminal 42 used by the left controller 3 to perform wired communication with the main body apparatus 2.

Figure 5:
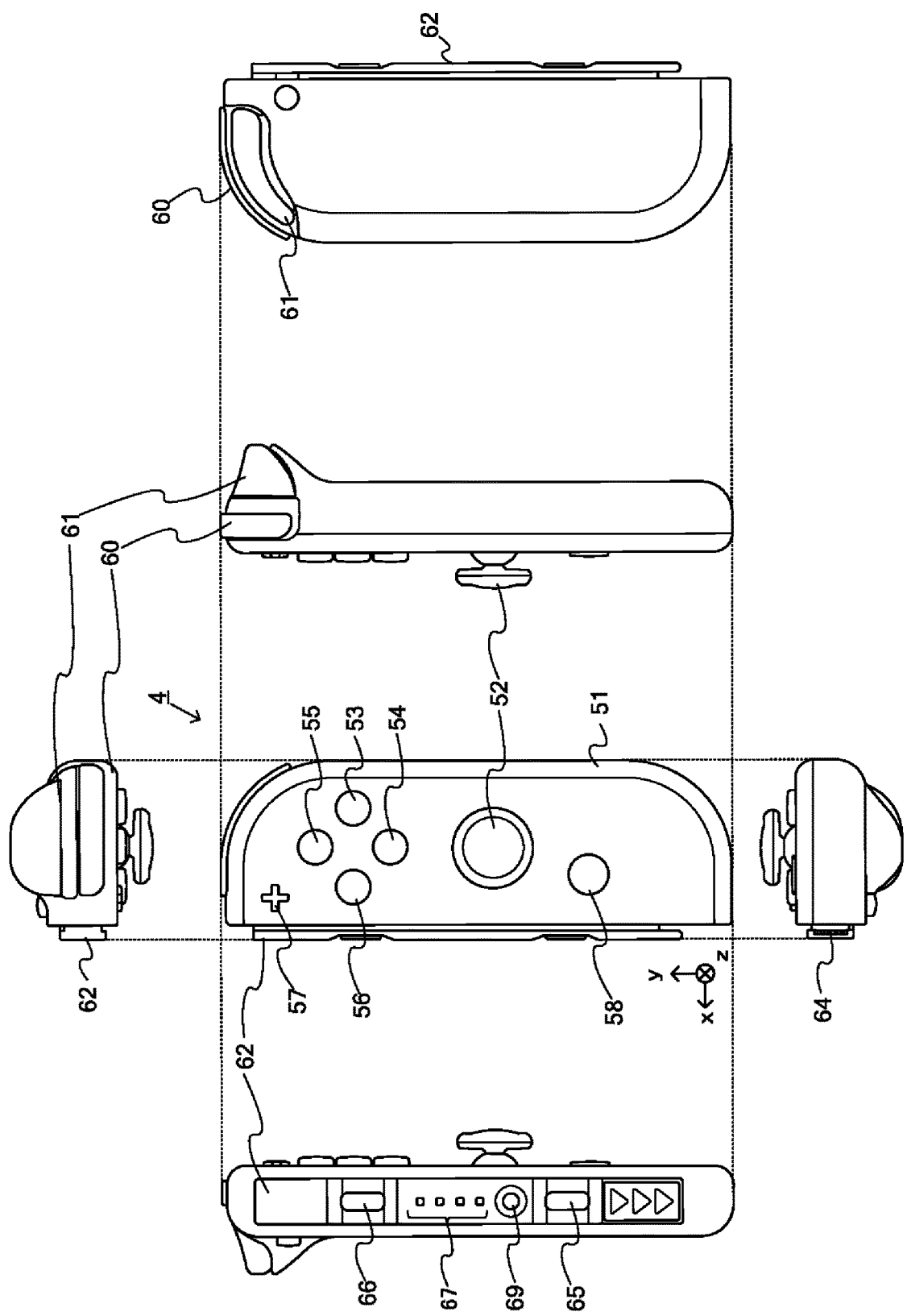
FIG. 5 is a six-sided view showing an example of the right controller.

FIG. 5 is a six-sided view illustrating an example of the right controller 4. As illustrated in FIG. 5, the right controller 4 includes a housing 51. In the present embodiment, the housing 51 has a vertically long shape, that is, a long shape in the vertical direction. The right controller 4 can also be held in a vertically long orientation in a state detached from the main body apparatus 2. The housing 51 has a shape and size that can be held with one hand, in particular with the right hand, in a case of being held in a vertically long orientation. Moreover, the right controller 4 can also be held in a landscape orientation. In the case where the right controller 4 is held in a landscape orientation, it may be held with both hands.

Similarly to the left controller 3, the right controller 4 includes an analog stick 52 as a direction input unit. In the present embodiment, the analog stick 52 has the same configuration as the analog stick 32 of the left controller 3. Instead of the analog stick, a cross key or a slide stick capable of inputting a slide or the like may be provided. Similarly to the left controller 3, the right controller 4 includes four operation buttons 53 to 56 (specifically, A button 53, B button 54, X button 55, and Y button 56) on the main surface of the housing 51. Furthermore, the right controller 4 includes a + (plus sign) button 57 and a home button 58. The right controller 4 also includes a first R button 60 and a ZR button 61 on the upper right of the side surface of the housing 51. Similarly to the left controller 3, the right controller 4 includes a second L button 65 and a second R button 66.

Moreover, the right controller 4 includes a terminal 64 used by the right controller 4 to perform wired communication with the main body apparatus 2.

Figure 6:
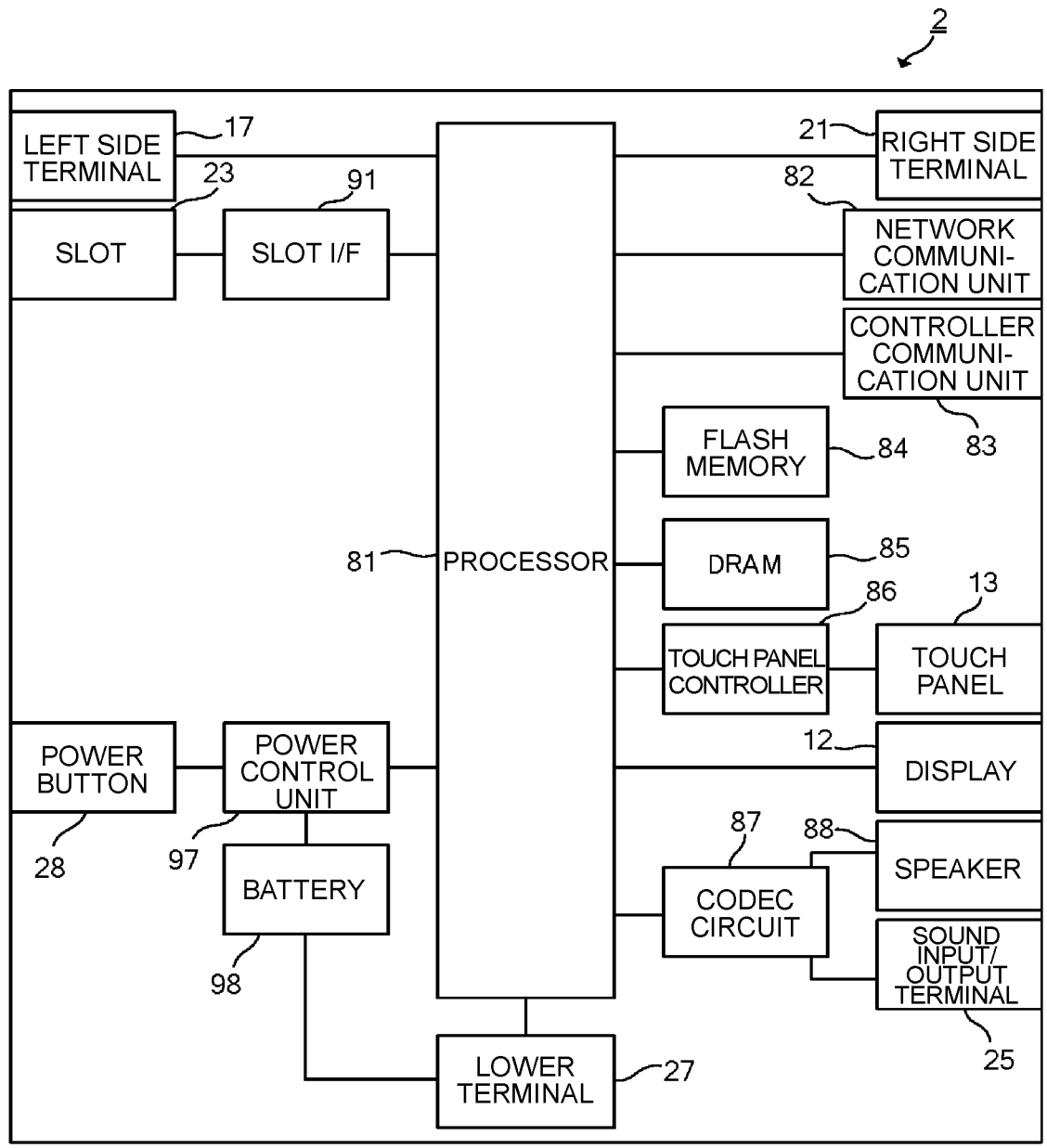
FIG. 6 is a block diagram showing an example of an internal configuration of the main body apparatus.

FIG. 6 is a block diagram illustrating an example of the internal configuration of the main body apparatus 2. In addition to the configuration illustrated in FIG. 3, the main body apparatus 2 includes individual components 81 to 91, 97 and 98 illustrated in FIG. 6. Some of these components 81 to 91, 97 and 98 may be mounted on an electronic circuit board as electronic components and stored in the housing 11.

The main body apparatus 2 includes a processor 81. The processor 81 is an information processing unit that executes various types of information processing to be executed in the main body apparatus 2, and may be constituted only by a CPU (Central Processing Unit), for example, or it may be constituted by a system-on-a-chip (SoC) including a plurality of functions such as a CPU function and a GPU (Graphics Processing Unit) function. The processor 81 executes various types of information processing by executing an information processing program (for example, a game program) stored in a storage unit (specifically, an internal storage medium such as a flash memory 84 or an external storage medium attached to the slot 23, or the like).

The main body apparatus 2 includes the flash memory 84 and a dynamic random access memory (DRAM) 85 as an exemplary internal storage medium incorporated in oneself. The flash memory 84 and the DRAM 85 are connected to the processor 81. The flash memory 84 is mainly used for storing various data (or may be programs) stored in the main body apparatus 2. The DRAM 85 is a memory used for temporarily storing various data used in information processing.

The main body apparatus 2 includes a slot interface (hereinafter abbreviated as "I/F") 91. The slot I/F 91 is connected to the processor 81. The slot I/F 91 is connected to the slot 23, and performs reading and writing of data from/into a predetermined type of storage medium (for example, a dedicated memory card) attached to the slot 23 in accordance with an instruction of the processor 81.

The processor 81 appropriately reads or writes data to and from the flash memory 84 and the DRAM 85 and the individual storage media, thereby executing the above-described information processing.

The main body apparatus 2 includes a network communication unit 82. The network communication unit 82 is connected to the processor 81. The network communication unit 82 performs communication (specifically, wireless communication) with an external apparatus via a network. In the present embodiment, the network communication unit 82 communicates with an external apparatus using a wireless LAN connection with a method conforming to the Wi-Fi standard as a first communication mode. Moreover, the network communication unit 82 performs wireless communication with another main body apparatus 2 of the same type by a predetermined communication method (for example, communication based on a proprietary protocol or infrared communication) as a second communication mode. Note that the wireless communication according to the second communication mode is capable of performing wireless communication with another main body apparatus 2 arranged in a closed local network area and achieves a function enabling "local communication" of transferring data by directly communicating among a plurality of main body apparatuses 2.

The main body apparatus 2 includes a controller communication unit 83. The controller communication unit 83 is connected to the processor 81. The controller communication unit 83 performs wireless communication with one or both of the left controller 3 and the right controller 4. While it is allowable to use any communication system between the main body apparatus 2 and the left controller 3 and between the main body apparatus 2 and the right controller 4, the present embodiment uses communication conforming to Bluetooth (registered trademark) standard to be used for communication by the controller communication unit 83 with the left controller 3 and with the right controller 4.

The processor 81 is connected to the left side terminal 17, the right side terminal 21, and the lower terminal 27 described above. In a case of performing wired communication with the left controller 3, the processor 81 transmits data to the left controller 3 via the left side terminal 17 and receives operation data from the left controller 3 via the left side terminal 17. Moreover, in a case of performing wired communication with the right controller 4, the processor 81 transmits data to the right controller 4 via the right side terminal 21 and receives operation data from the right controller 4 via the right side terminal 21. Moreover, in a case of communicating with the cradle, the processor 81 transmits data to the cradle via the lower terminal 27. In this manner, in the present embodiment, the main body apparatus 2 can perform both wired communication and wireless communication with the left controller 3 and the right controller 4. Moreover, in a case where the integrated apparatus including the left controller 3 and the right controller 4 attached to the main body apparatus 2 is attached to the cradle or where the main body apparatus 2 alone is attached to the cradle, the main body apparatus 2 can output data (for example, image data and sound data) to the stationary monitor, or the like, via the cradle.

Note that the main body apparatus 2 can communicate simultaneously (in other words, in parallel) with a plurality of left controllers 3. Moreover, the main body apparatus 2 can communicate simultaneously (in other words, in parallel) with a plurality of right controllers 4. This makes it possible to perform inputs by the user into the main body apparatus 2 using the plurality of left controllers 3 and the plurality of right controllers 4. As an example, the first user inputs to the main unit 2 using the first set of the left controller 3 and the right controller 4, and at the same time the second user uses the second set of the left controller 3 and the right controller 4 to input to the main body device 2.

The main body apparatus 2 includes a touch panel controller 86 as a circuit for controlling the touch panel 13. The touch panel controller 86 is connected between the touch panel 13 and the processor 81. The touch panel controller 86 generates, for example, data indicating a position of input of a touch input on the basis of a signal from the touch panel 13 and outputs the generated data to the processor 81.

Moreover, the display 12 is connected to the processor 81. The processor 81 displays on the display 12 one or both of the generated image (for example, by executing the above information processing) and the image obtained from the outside.

The main body apparatus 2 includes a coder/decoder (codec) circuit 87 and speakers (specifically, a left speaker and a right speaker) 88. The codec circuit 87 is connected to the speaker 88 and a sound input/output terminal 25, and is also connected to the processor 81. The codec circuit 87 is a circuit for controlling input and output of sound data to and from the speaker 88 and the sound input/output terminal 25.

The main body apparatus 2 includes a power control unit 97 and a battery 98. The power control unit 97 is connected to the battery 98 and the processor 81. Although not illustrated, the power control unit 97 is connected to each of portions of the main body apparatus 2 (specifically, each of portions receiving the power supply of the battery 98, the left side terminal 17, and the right side terminal 21). The power control unit 97 controls power supply from the battery 98 to each of the above-described portions on the basis of a command from the processor 81.

Moreover, the battery 98 is connected to the lower terminal 27. In a case where an external charging apparatus (for example, a cradle) is connected to the lower terminal 27 and the power is supplied to the main body apparatus 2 via the lower terminal 27, the supplied power is charged in the battery 98.

Figure 7:
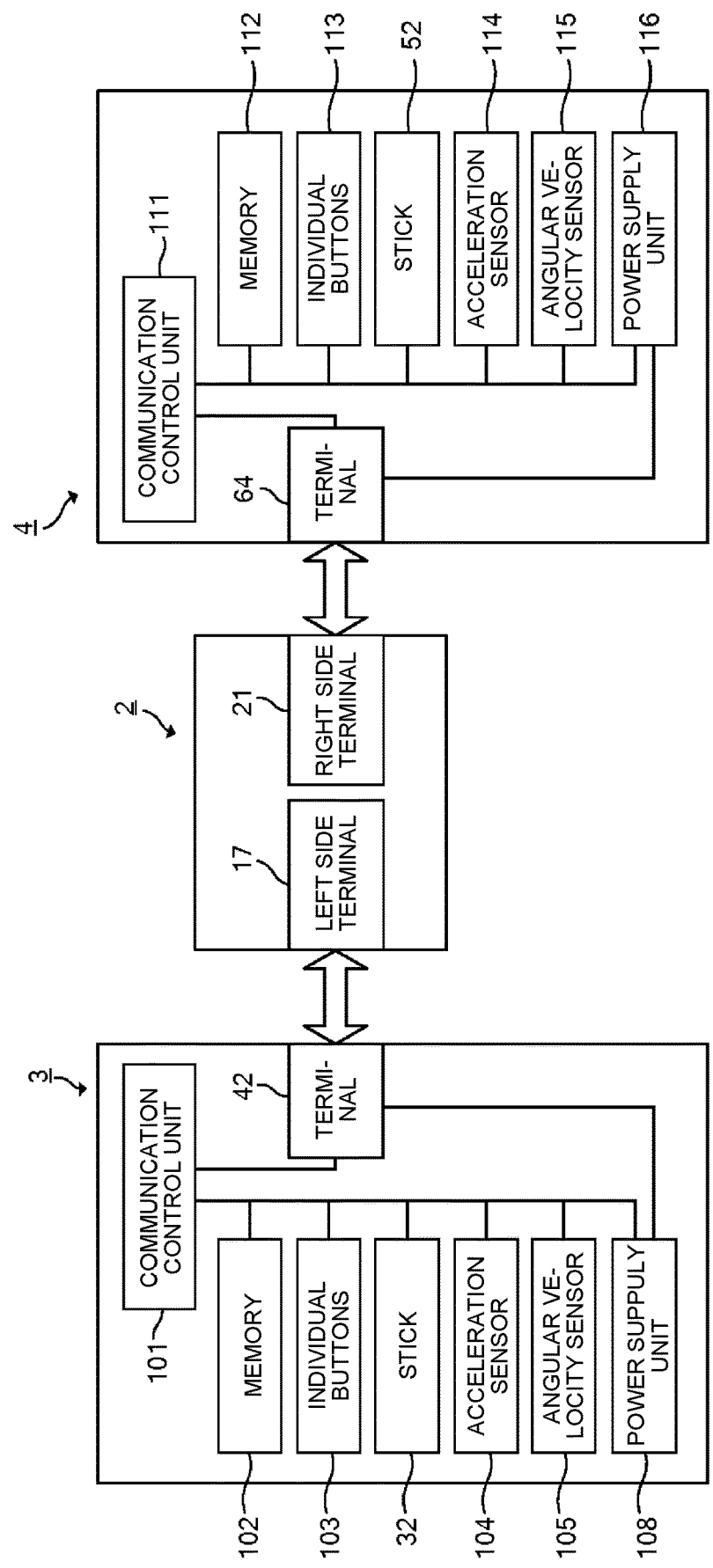
FIG. 7 is a block diagram showing an example of an internal configuration of the main body apparatus, the left controller, and the right controller.

FIG. 7 is a block diagram illustrating an exemplary internal configuration of the main body apparatus 2, the left controller 3, and the right controller 4. Note that details of the internal configuration related to the main body apparatus 2 are omitted in FIG. 7 because they are illustrated in FIG. 6.

The left controller 3 includes a communication control unit 101 that communicates with the main body apparatus 2. As illustrated in FIG. 7, the communication control unit 101 is connected to each of components including the terminal 42. In the present embodiment, the communication control unit 101 can communicate with the main body apparatus 2 by both wired communication via the terminal 42 and wireless communication not via the terminal 42. The communication control unit 101 controls a communication method performed by the left controller 3 on the main body apparatus 2. That is, in a case where the left controller 3 is attached to the main body apparatus 2, the communication control unit 101 communicates with the main body apparatus 2 via the terminal 42. In contrast, in a case where the left controller 3 is detached from the main body apparatus 2, the communication control unit 101 performs wireless communication with the main body apparatus 2 (specifically, the controller communication unit 83). Wireless communication between the controller communication unit 83 and the communication control unit 101 is performed in accordance with the Bluetooth (registered trademark) standard, for example.

Moreover, the left controller 3 includes a memory 102 such as a flash memory. The communication control unit 101 is formed with, for example, a microcomputer (also referred to as a microprocessor) and executes various types of processing by executing firmware stored in the memory 102.

The left controller 3 includes individual buttons 103 (specifically, buttons 33 to 39, 43, 44, 46, and 47). The left controller 3 also includes the analog stick 32 (described as "stick" in FIG. 7). Individual buttons 103 and the analog stick 32 repeatedly output information related to the operation performed on oneself to the communication control unit 101 at an appropriate timing.

The left controller 3 includes an inertial sensor. Specifically, the left controller 3 includes an acceleration sensor 104. In addition, the left controller 3 includes an angular velocity sensor 105. In the present embodiment, the acceleration sensor 104 detects the magnitude of the acceleration in predetermined three axes (for example, the x-, y-, z-axes illustrated in FIG. 4) directions. Note that the acceleration sensor 104 may be configured to detect accelerations in one axial direction or two axial directions. In the present embodiment, the angular velocity sensor 105 detects an angular velocity around predetermined three axes (for example, the x-, y-, z-axes illustrated in FIG. 4). Note that the angular velocity sensor 105 may detect angular velocity about one axis or around two axes. Each of the acceleration sensor 104 and the angular velocity sensor 105 is connected to the communication control unit 101. Then, the detection results of the acceleration sensor 104 and the angular velocity sensor 105 are repeatedly output to the communication control unit 101 at an appropriate timing.

The communication control unit 101 obtains information related to the input (specifically, information related to the operation or a detection result by the sensor) from each of input units (specifically, the individual buttons 103, the analog stick 32, the sensors 104 and 105). The communication control unit 101 transmits the operation data including the obtained information (or the information obtained by performing predetermined processing on the obtained information) to the main body apparatus 2. The operation data is repeatedly transmitted at a rate of once every predetermined time. The interval at which the information related to the input is transmitted to the main body apparatus 2 may either be the same or not the same for individual input units.

With transmission of the above-described operation data to the main body apparatus 2, the main body apparatus 2 can obtain the input performed onto the left controller 3. That is, the main body apparatus 2 can distinguish the operation onto the individual buttons 103 and the analog stick 32 on the basis of the operation data. Moreover, the main body apparatus 2 can calculate information related to one or both of the movement and the posture of the left controller 3 on the basis of operation data (specifically, detection results of the acceleration sensor 104 and the angular velocity sensor 105).

The left controller 3 includes a power supply unit 108. In the present embodiment, the power supply unit 108 includes a battery and a power control circuit. Although not illustrated, the power control circuit is connected to the battery and is also connected to each of portions of the left controller 3 (specifically, each of portions receiving power supply of the battery).

As illustrated in FIG. 7, the right controller 4 includes a communication control unit 111 that communicates with the main body apparatus 2. The right controller 4 also includes a memory 112 connected to the communication control unit 111. The communication control unit 111 is connected to each of the components including the terminal 64. The communication control unit 111 and the memory 112 have the functions similar to the functions of the communication control unit 101 and the memory 102 of the left controller 3. Accordingly, the communication control unit 111 can communicate with the main body apparatus 2 in both wired communication via the terminal 64 and wireless communication not via the terminal 64 (specifically, communication conforming to the Bluetooth (registered trademark) standard) and controls the communication method performed by the right controller 4 onto the main body apparatus 2.

The right controller 4 includes individual input units similar to the individual input units of the left controller 3. Specifically, the right controller 4 includes the individual buttons 113, the analog stick 52, and an inertial sensor (an acceleration sensor 114 and an angular velocity sensor 115). Each of these input units has functions similar to individual input units of the left controller 3 and operates in the similar manner.

The right controller 4 includes a processing unit 121. The processing unit 121 is connected to communication control unit 111. The right controller 4 includes a power supply unit 118. The power supply unit 118 has functions similar to the functions of the power supply unit 108 of the left controller 3 and operates in the similar manner.

Figure 8:
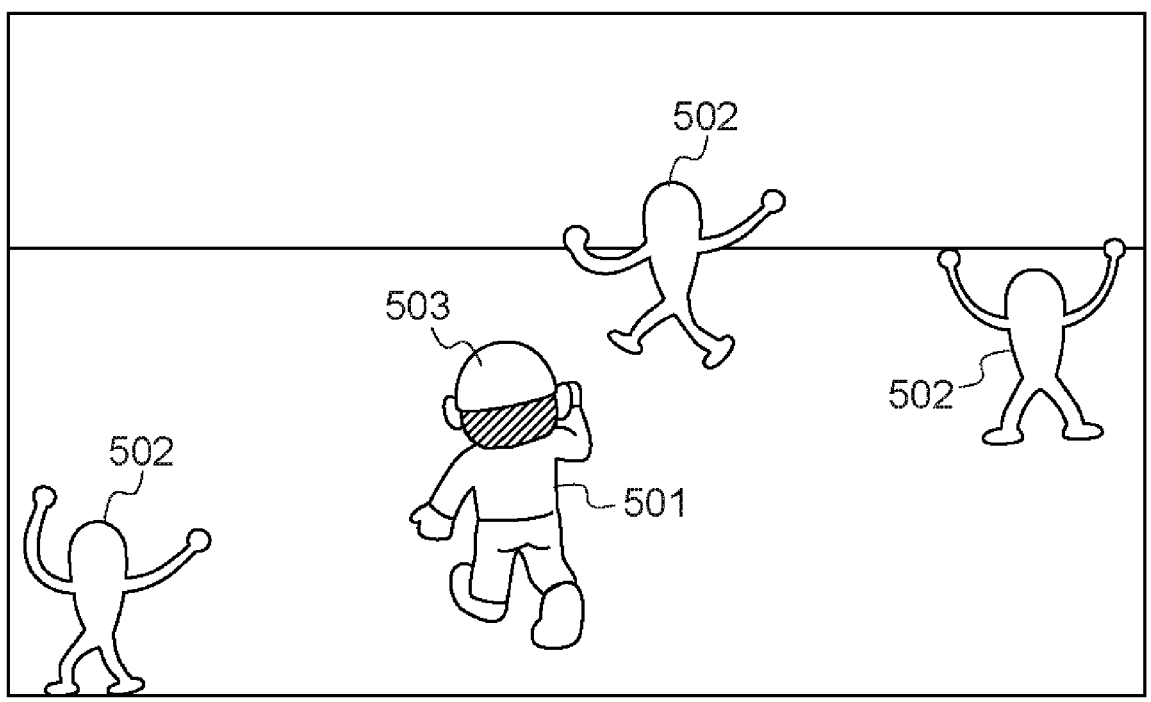
FIG. 8 shows an example of a game screen displayed by game processing in a game system.

Next, control of the game system 1 according to the present embodiment is described. FIG. 8 shows an example of a game screen displayed by game processing in the game system 1. In this game, a virtual three-dimensional space is provided as an example of a virtual space. The game develops as a player object 501 moves in a virtual space where a plurality of non-player objects 502 are present. The player object 501 is an object that is operated by a player. The player object 501 puts on a cap object 503. The player object 501 throws the cap object 503 according to a predetermined operation by the player. With this throwing operation, the cap object 503 is thrown from the player object 501 and then returned to the player object 501. This cap throwing operation by the player object 501 is hereinafter referred to as "cap throwing operation", and the process for the cap throwing operation by the game system 1 is hereinafter referred to as "cap throwing process".

Figure 9:
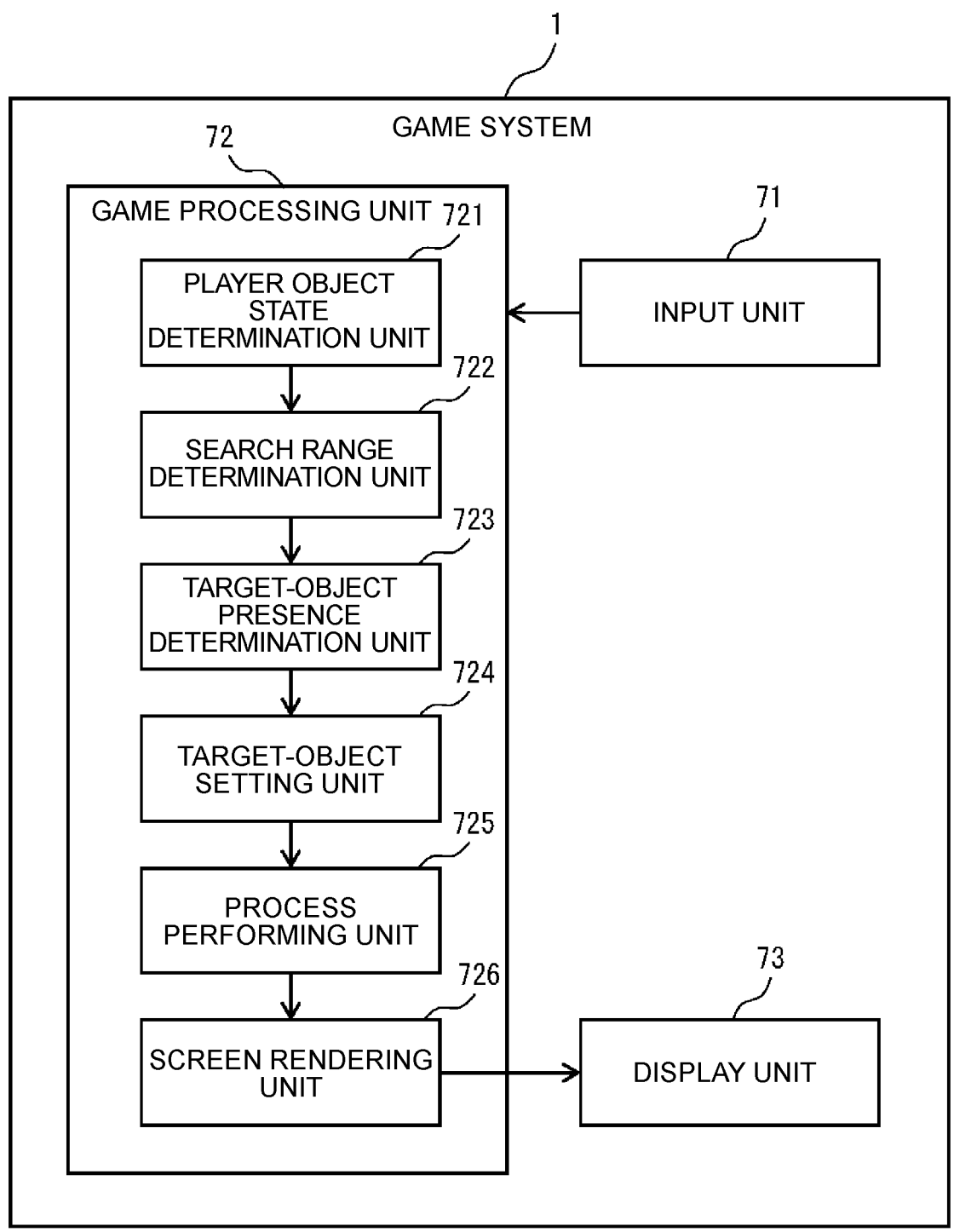
FIG. 9 is a block diagram showing a configuration for performing the game processing in the game system.

FIG. 9 is a block diagram showing a configuration for performing the game processing in the game system 1. The game system 1 includes an input unit 71 that enables a player to make inputs, a game processing unit 72 that performs the game processing, and a display unit 73 that displays a game screen. A configuration constituted by the left controller 3 and the left side terminal 17 of the main body apparatus 2 shown in FIG. 7 and a configuration constituted by the right controller 4 and the right side terminal 21 of the main body apparatus 2 shown in FIG. 7 correspond to the input unit 71. In addition, a configuration constituted by the touch panel 13 and the touch panel controller 86 of the main body apparatus 2 may correspond to the input unit 71. A configuration constituted by the processor 81, the flash memory 84, and the DRAM 85 of the main body apparatus 2 corresponds to the game processing unit 72. The display 12 of the main body apparatus 2 corresponds to the display unit 73. The stationary monitor described above may also correspond to the display unit 73.

The game processing unit 72 performs the game processing according to an input to the input unit 71 that is made by the player. The player can operate the player object in the virtual space by the input to the input unit 71. When the player object 501 is operated by the left controller 3 and the right controller 4 (typically, the player holds the left controller 3 separated from the main body apparatus 2 in the left hand and holds the right controller 4 separated from the main body apparatus 2 in the right hand), the player object 501 is moved in the virtual space according to the tilt of the stick 32. Specifically, the player object 501 is moved in the virtual space at a speed according to the tilt amount of the stick 32 in a direction according to the tilt direction of the stick 32.

The game processing unit 72 includes a player object state determination unit 721, a search range determination unit 722, a target-object presence determination unit 723, and a target-object setting unit 724. The player object state determination unit 721 determines a state of the player object 501 in a virtual space. The search range determination unit 722 determines a search range for searching for the non-player object 502 based on a state of the player object 501. The target-object presence determination unit 723 searches for (determines) whether the non-player object 502 is present in a search range. If it is determined that the non-player object 502 is present in a search range, the target-object setting unit 724 sets the non-player object 502 as a target of the cap throwing process, that is, a target to which a cap is thrown.

In addition, the game processing unit 72 includes a process performing unit 725 that performs the cap throwing process by using the non-player object 502 having been set as a target and a screen rendering unit 726 that generates a game screen that reflects a result of the process performed by the process performing unit 725. A game screen generated by the screen rendering unit 726 is displayed on the display unit 73.

Figure 10:
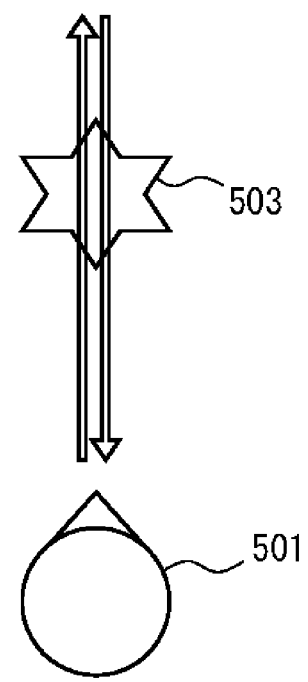
FIG. 10 is an explanatory diagram of a basic operation of a cap throwing process.

FIG. 10 is an explanatory diagram of a basic operation of the cap throwing process. FIG. 10 shows the player object 501 in a virtual space as viewed from above. The direction in which a part of the player object 501 shown in FIG. 10 is launched from the player object 501 corresponds to the front direction of the player object 501. When the player object 501 is operated by the left controller 3 and the right controller 4, for example, the player object 501 performs the cap throwing operation by the A button 53 of the right controller 4 being pressed.

Basically in the cap throwing process, as shown in FIG. 10, the player object 501 is set as a start point and the cap object 503 is launched in the front direction of the player object 501. The cap object 503 travels a predetermined distance and then returns to the player object 501. As described above, basically in the cap throwing operation, the cap object 503 is thrown (launched) from the player object 501 in a direction determined by setting the front direction of the player object 501 as a reference. When the cap object 503 is not thrown, the player object 501 puts the cap object 503 on the head, as shown in FIG. 8.

Figure 11:
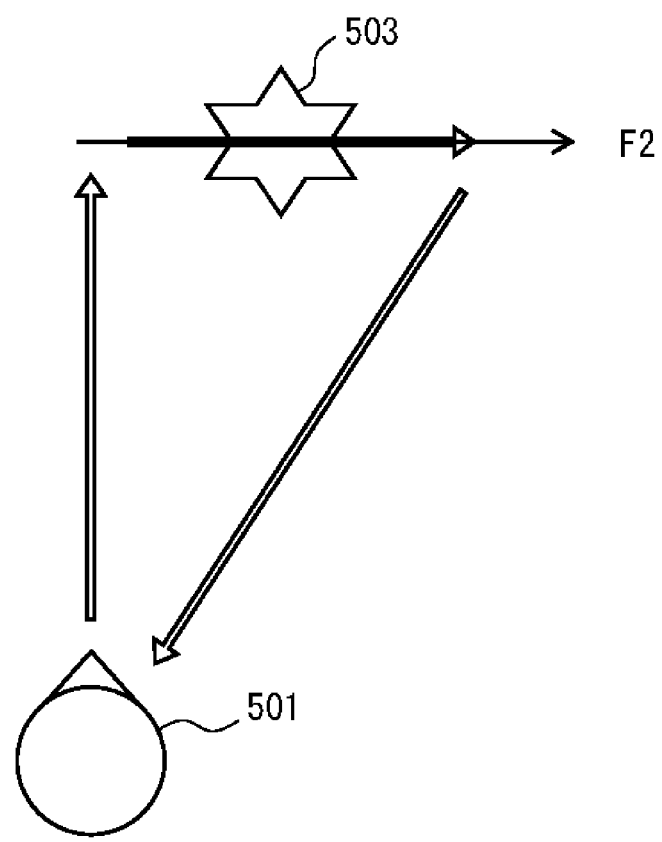
FIG. 11 is an explanatory diagram of a course changing operation in the cap throwing process.

FIG. 11 is an explanatory diagram of a course changing operation in the cap throwing process. While the cap is launched from the player object 501 and is becoming far away from the player object 501 in the cap throwing operation described above, if the player shakes the left controller 3 or the right controller 4 in the right or left direction, that is, performs a shaking operation, the cap object 503 changes the course after traveling a predetermined distance, turns in a direction of the shaking operation, and then returns to the player object 501. This shaking operation can be detected by the acceleration sensor 114 and/or the angular speed sensor 115 of the right controller 4. The shaking operation for the course changing operation may be accepted by the left controller 3.

In the game according to the present embodiment, the player object 501 throws the cap object 503 as described above, thus achieving various game effects. For example, it is possible to achieve a game effect in which the thrown cap object 503 hits a predetermined non-player object 502 and thus the non-player object 502 is possessed by the player object 501 (the non-player object 502 becomes the player object that is operated by the player). A player assist function when the player tries to hit the cap object 503 on the non-player object 502 by the cap throwing operation is described below.

It is not easy to accurately direct the front direction of the player object 501 to a direction in which the non-player object 502 is present and then to throw and hit the cap object 53 on the non-player object 502. In particular, it is not easy to throw and hit the cap object 503 on the moving non-player object 502.

In the present embodiment, the direction in which the cap object 503 is launched is basically the front direction of the player object 501 in the cap throwing operation. At the same time, the present embodiment employs the player assist function in which when the non-player object 502 is present in a predetermined search range about the front direction of the player object 501, the direction in which the cap object 503 is launched is not set to the front direction of the player object 501 and instead the cap object 503 is launched to the non-player object 502 to hit the non-player object 502.

Figure 12:
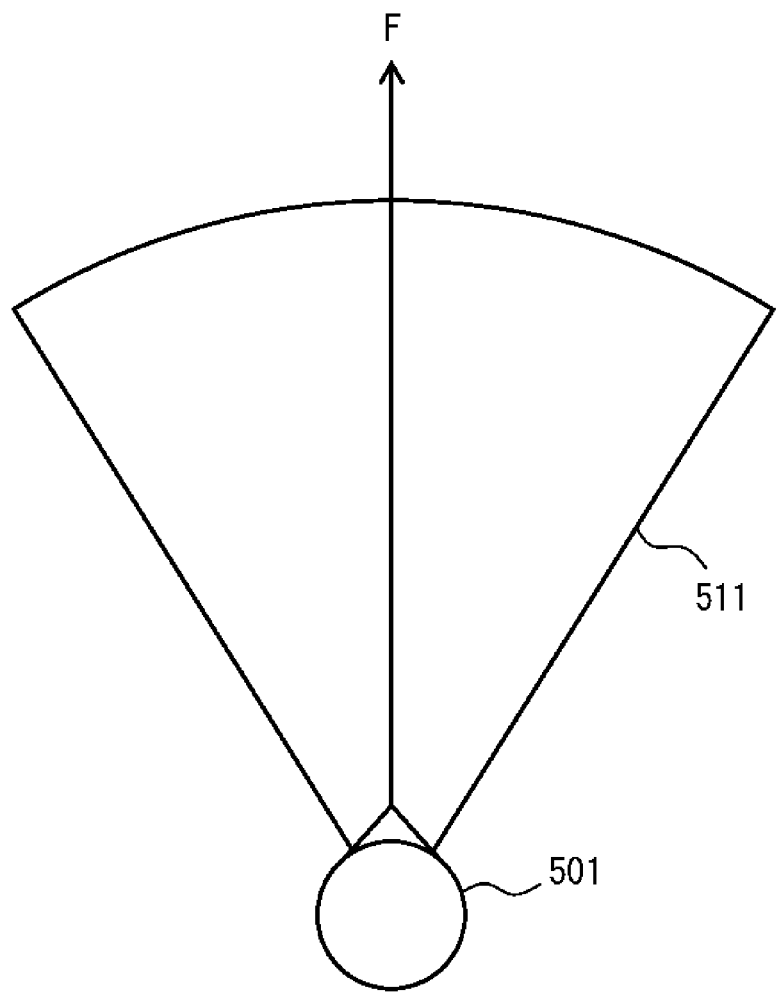
FIG. 12 is an explanatory diagram of a cap throwing operation in which a direction of launching a cap object is corrected by a player assist function.
Figure 13:
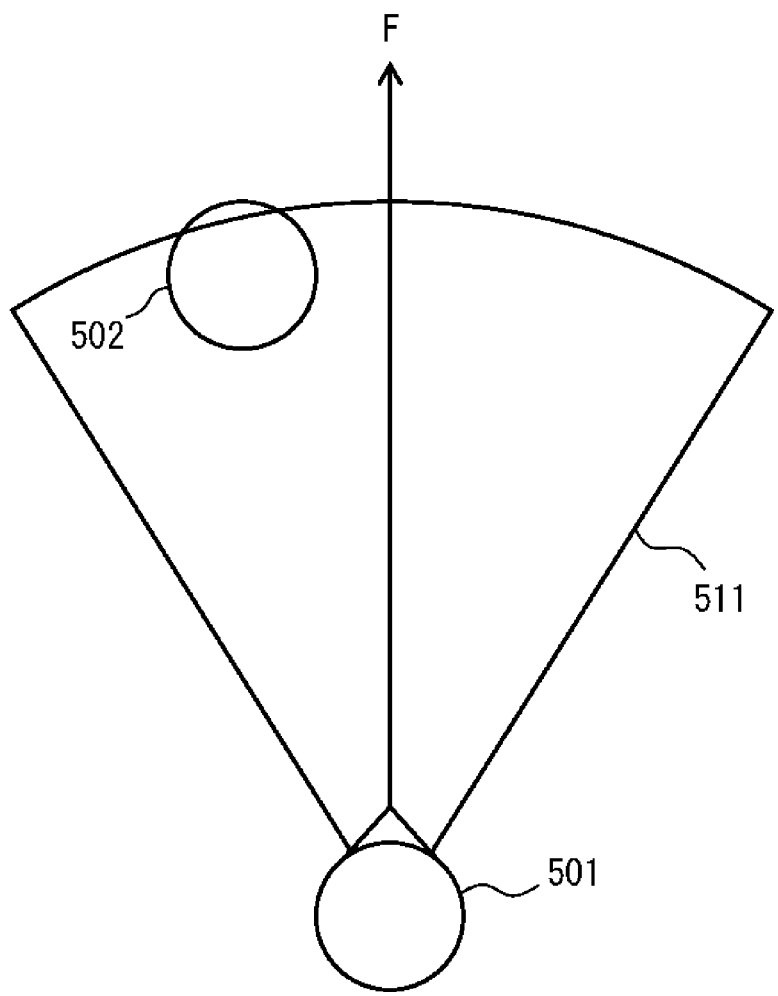
FIG. 13 is an explanatory diagram of the cap throwing operation in which the direction of launching the cap object is corrected by the player assist function.
Figure 14:
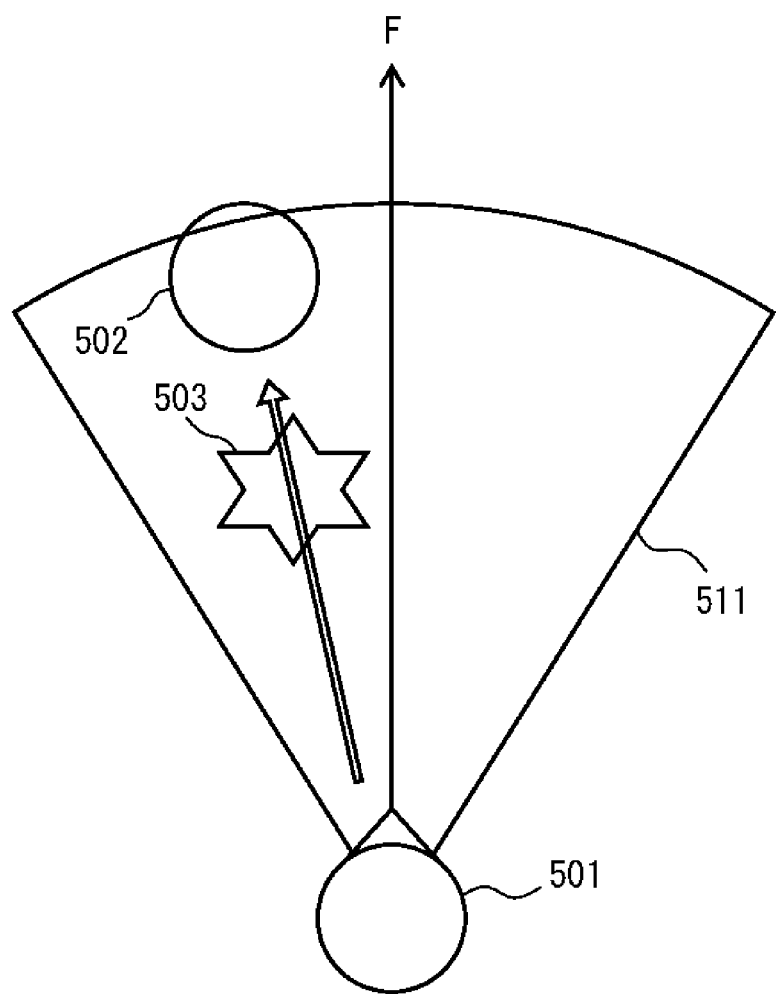
FIG. 14 is an explanatory diagram of the cap throwing operation in which the direction of launching the cap object is corrected by the player assist function.

FIGS. 12 to 14 are explanatory diagrams of the cap throwing operation in which the direction of launching the cap object 503 is corrected by the player assist function. As shown in FIG. 12, the search range determination unit 722 sets a sector-shaped search range 511 with a predetermined radius in which the center is the player object 501 and the front direction F of the player object 501 is a center line of the central angle. The target-object presence determination unit 723 determines whether the non-player object 502 is present in the search range 511.

When the non-player object 502 is present in the search range 511 as shown in FIG. 13, the target-object setting unit 524 sets the non-player object 502 as a target object. The process performing unit 725 performs the cap throwing process in which the launch direction is directed to the target object as shown in FIG. 14. As a result, with the cap throwing operation, the cap object 503 hits the non-player object 502 that is present in the search range 511.

Such a cap throwing operation can be performed while moving the player object 501 or changing the direction of the player object 501. If the player presses the A button 53 while tilting the stick 32, the player can perform the cap throwing operation while moving the player object 501 or changing the direction of the player object 501.

The game processing unit 72 according to the present embodiment has a function of adjusting the size of a search range according to the state of the player object 501. Specifically, the game processing unit 72 adjusts the search range according to the operational state of the player object 501 (the magnitude of a positional change and the magnitude of a directional change). For such an adjustment, the player object state determination unit 721 determines the magnitude of a movement input to the player object 501 and the magnitude of a change in directional input to the player object 501.

The player object state determination unit 721 determines the magnitude of a movement input based on the tilt angle (the tilt amount) of the stick 32. That is, as the tilt angle of the stick 32 is large, it is determined that the movement input is large. In addition, the player object state determination unit 721 determines the magnitude of a change in directional input based on an average value or an accumulated value of changes in directional input in a predetermined time (in a predetermined number of frames) in the past. That is, as the number of frames including a directional change among the predetermined number of frames in the past is large, it is determined that a change in directional input is large.

The search range determination unit 722 adjusts the size of a search range based on the magnitude of a movement input to the player object 501 and the magnitude of a change in directional input to the player object 501 that are determined by the player object state determination unit 721. Specifically, as the movement input to the player object 501 is large, the search range determination unit 722 reduces the central angle of the search range 511, and as the movement input to the player object 501 is small, the search range determination unit 722 increases the central angle of the search range 511.

In the present embodiment, the search range determination unit 722 continuously changes the central angle of the search range 511 based on the magnitude of a movement input to the player object 501. Instead thereof, the search range determination unit 722 may discretely change the central angle of the search range 511 based on the magnitude of a movement input to the player object 501. When the search range determination unit 722 discretely changes the central angle, the search range determination unit 722 may execute two-stage control. In the two-stage control, when there is a movement input to the player object 501 (or when a movement input is larger than a predetermined threshold), the search range determination unit 722 sets the size of the central angle to a first size. When there is no movement input to the player object 501 (or when a movement input is equal to or less than a predetermined threshold), the search range determination unit 722 sets the size of the central angle to a second size larger than the first size.

Figure 15:
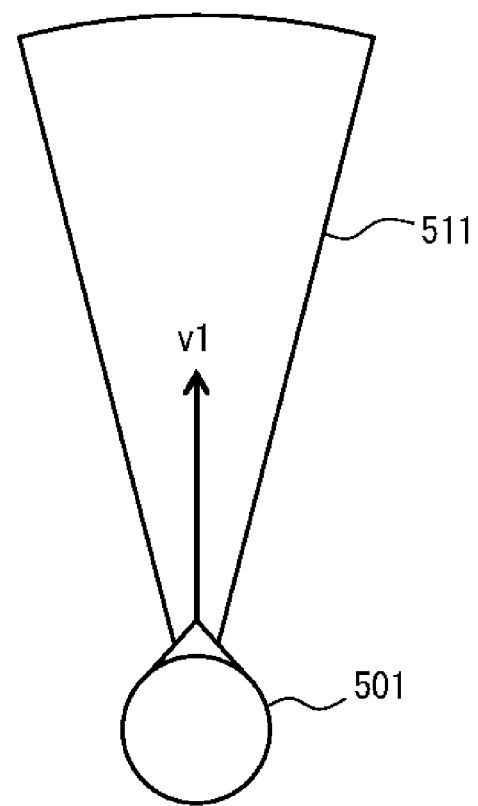
FIG. 15 shows a search range when a movement input is relatively large.
Figure 16:
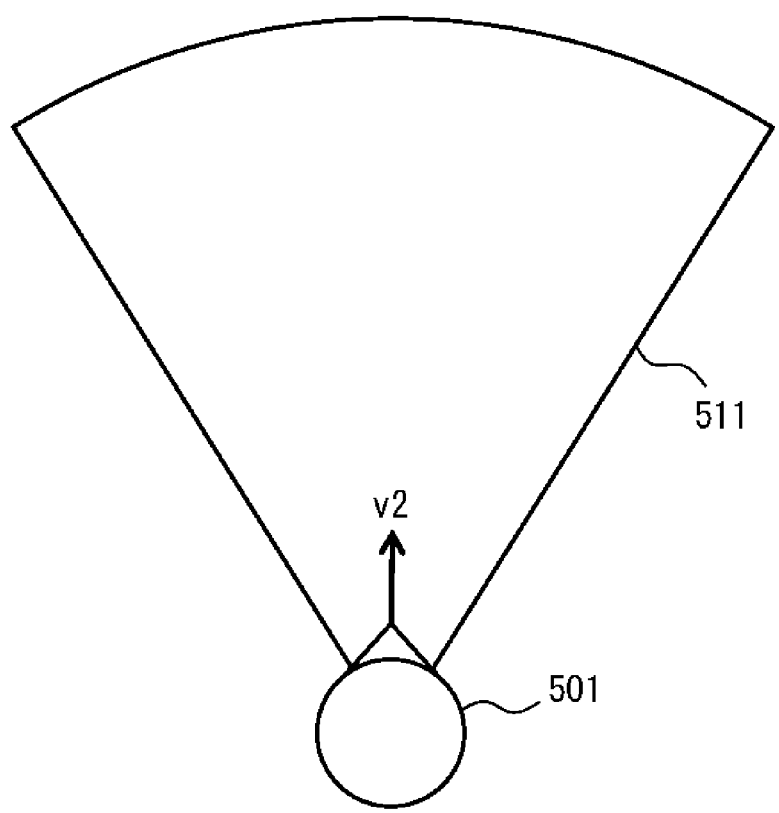
FIG. 16 shows a search range when the movement input is relatively small.

FIG. 15 shows the search range 511 when a movement input is relatively large. FIG. 16 shows the search range 511 when a movement input is relatively small. As shown in FIGS. 15 and 16, the relationship between a movement input (a movement speed) v1 of the player object 501 in a case of FIG. 15 and a movement input (a movement speed) v2 of the player object 501 in a case of FIG. 16 is represented as v1>v2. The central angle of the search range 511 in the case of FIG. 16 where the movement input is relatively small is set to be larger than that in the case of FIG. 15 where the movement input is relatively large.

As the change in directional input to the player object 501 is large, the search range determination unit 722 increases the central angle of the search range 511, and as the change in directional input to the player object 501 is small, the search range determination unit 722 reduces the central angle of the search range 511. In the present embodiment, the search range determination unit 722 continuously changes the central angle of the search range 511 based on the magnitude of the change in directional input to the player object 501. Instead thereof, the search range determination unit 722 may discretely change the central angle of the search range 511 based on the magnitude of the change in directional input to the player object 501.

When the search range determination unit 722 discretely changes the central angle, the search range determination unit 722 may execute two-stage control. In the two-stage control, when there is no change in directional input to the player object 501 (or when a change in directional input is equal to or less than a predetermined threshold), the search range determination unit 722 sets the size of the central angle to a third size. When there is a change in directional input to the player object 501 (or when a change in directional input is larger than a predetermined threshold), the search range determination unit 722 sets the size of the central angle to a fourth size larger than the third size.

Figure 17:
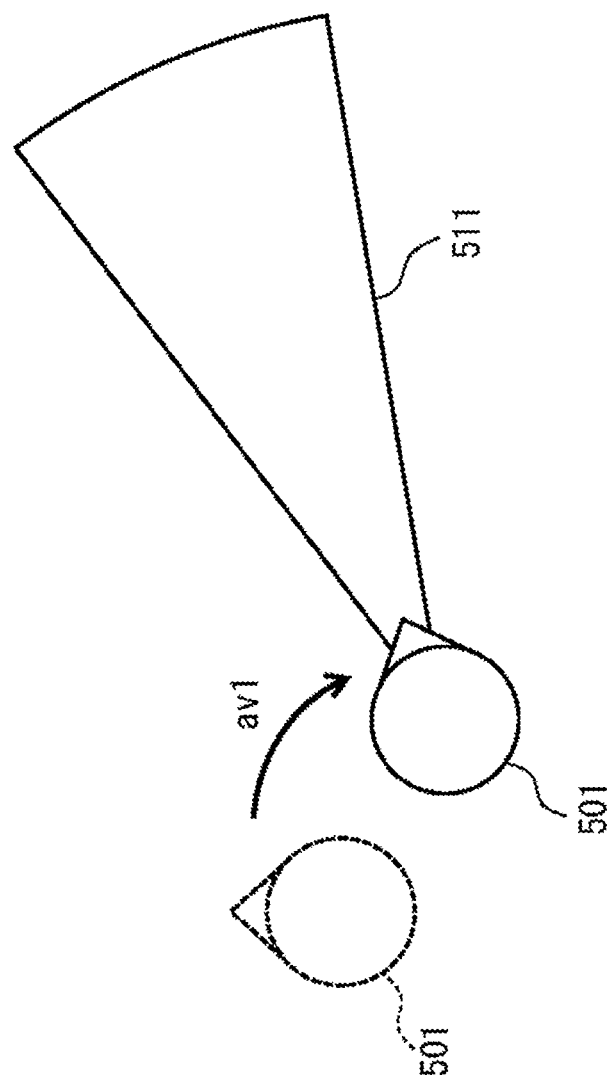
FIG. 17 shows a search range when a change in directional input is relatively small.
Figure 18:
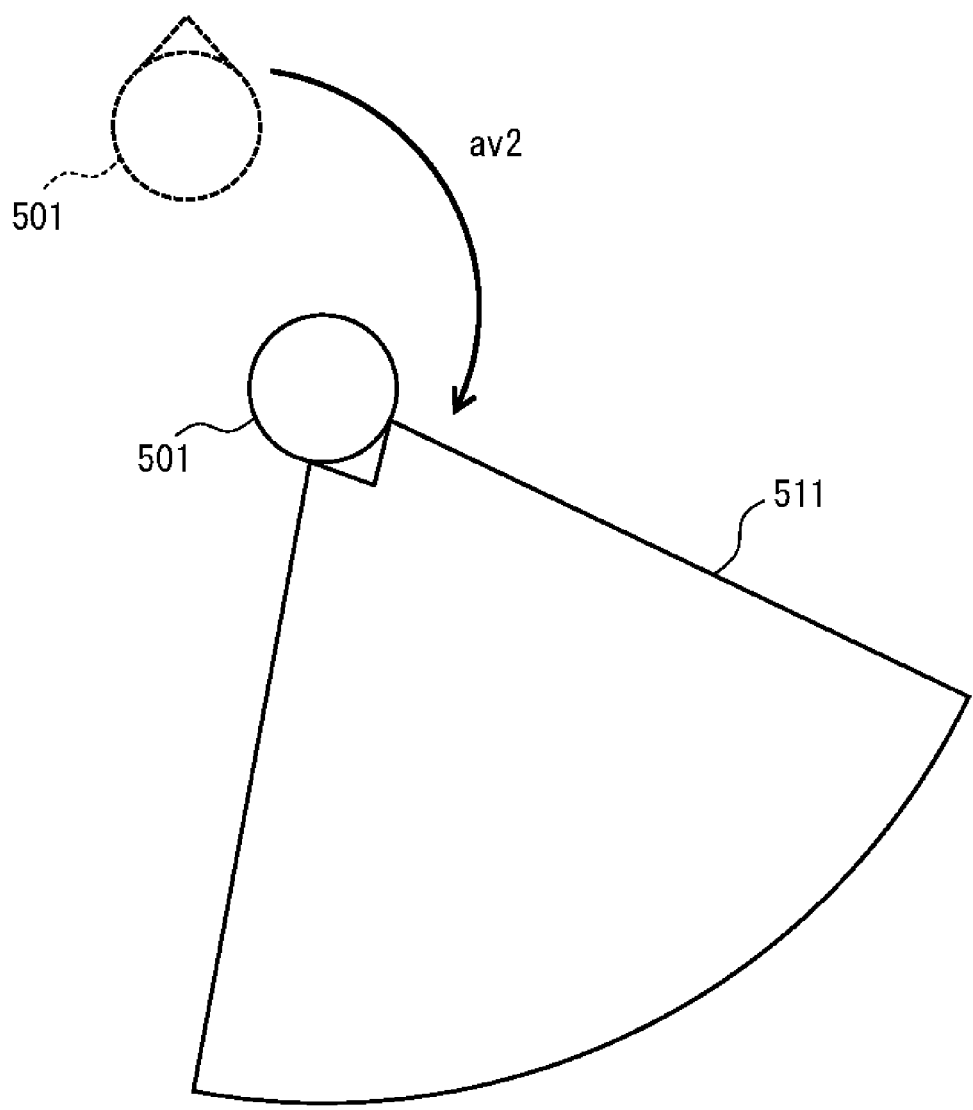
FIG. 18 shows a search range when the change in directional input is relatively large.

FIG. 17 shows the search range 511 when a change in directional input is relatively small. FIG. 18 shows the search range 511 when a change in directional input is relatively large. As shown in FIGS. 17 and 18, the relationship between a change av1 in directional input to the player object 501 in a case of FIG. 17 and a change av2 in directional input to the player object 501 in a case of FIG. 18 is represented as av1<av2. The central angle of the search range 511 in the case of FIG. 18 where the change in directional input is relatively large is set to be larger than that in the case of FIG. 17 where the change in directional input is relatively small.

In the present embodiment, the player object state determination unit 721 determines the magnitude of a movement input to the player object 501 based on the tilt amount of the stick 32. Instead thereof, the player object state determination unit 721 may determine the magnitude of a movement speed or a positional change amount of the player object 501 calculated by the game processing unit 72 based on the tilt amount of the stick 32. In the present embodiment, the player object state determination unit 721 determines the magnitude of a change in directional input to the player object 501 based on the time during which (the number of frames in which) an input of a directional change is made in a predetermined time (in a predetermined number of frames). Instead thereof, the player object state determination unit 721 may determine the magnitude of the change amount of a tilt direction of the stick 32 in a predetermined time. Alternatively, the player object state determination unit 721 may determine the magnitude of an angular difference from the front direction of the player object 501 whose direction is changed in a predetermined time (a predetermined number of frames) as a result of the game process performed by the game processing unit 72 based on a change in the tilt direction of the stick 32.

In addition, regarding a change in the direction of the player object 501, the player object state determination unit 721 may set the average value or the accumulated value of directional changes (angular differences mentioned above) in a predetermined time (a predetermined number of frames) in the past as the magnitude of the directional change. For example, the player object state determination unit 721 may set the average value or the accumulated value of angular differences between the tilt direction of a stick and the front direction of the player object 501 in the past ten frames as the magnitude of a directional change. Consequently, if the player object 501 largely turns to change its direction, it is determined that a directional change is large. It is also determined that a directional change is large immediately after the player object 51 turns small but makes a large angular change (for example, within ten frames).

The search range determination unit 722 sets the maximum central angle of the search range 511 to 60 degrees and the minimum central angle to 10 degrees, and adjusts the central angle of the search range 511 between these maximum value and minimum value according to the magnitude of a movement input to the player object 501 and the magnitude of a change in directional input to the player object 501. Specifically, when the change in directional input is large, the central angle is set to 60 degrees, which is the maximum value. When a stick is not operated and thus the player object 501 is not moved or rotated, the central angle is set to 20 degrees. When the player object 501 moves straight at the maximum speed, the central angle is set to 10 degrees, which is the minimum value. As described above, the central angle when the player object 501 is stationary is larger than the central angle when the player object 501 moves straight. When the player object 501 is rotated, the larger the change in directional input is, the larger the central angle is.

When the movement input to the player object 501 and the change in directional input to the player object 501 are too small to reach a predetermined threshold, it is determined that there are no movement input and no change in directional input.

Figure 19:
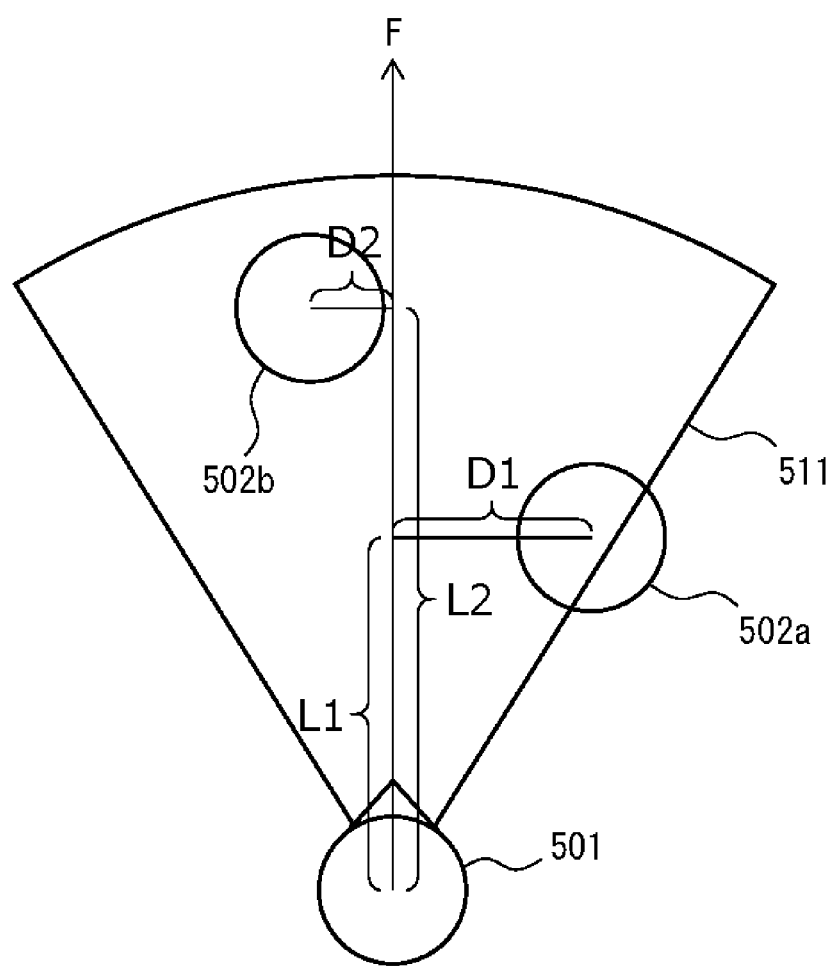
FIG. 19 is an explanatory diagram of a target setting process when a plurality of non-player objects are present in a search range.

FIG. 19 is an explanatory diagram of a target setting process when a plurality of non-player objects 502 are present in the search range 511. When a plurality of non-player objects 502a and 502b are present in the search range 511, the target-object setting unit 724 selects one non-player object 502 as a target object. At this time, the target-object setting unit 724 selects the non-player object 502 functioning as a target by taking the distance (the closeness) from the player object 501 to the non-player object 502 into consideration while regarding (the smallness of) a shift from the front direction of the player object 501 as important.

Specifically, the target-object setting unit 724 selects the non-player object 502 with a small evaluation value $G=L+\alpha D(\alpha>1)$ as a target object. In the evaluation value $G=L+\alpha D(\alpha>1)$, the length of a perpendicular from the non-player objects 502 in the search range 511 to an imaginary line extending in the front direction F of the player object 501 is denoted by D and the length from the foot of the perpendicular to the player object 501 is denoted by L. $\alpha$ denotes a coefficient that indicates the importance of the smallness of a shift from the front direction F of the player object 501, and is, for example, 5.

According to an example of FIG. 19, when $\alpha=5$, $D1=23$ and $L1=41$ for the non-player object 502a, and thus $G1=L1+\alpha D1=41+5\times23=156$ is obtained. Meanwhile, $D2=10$ and $L2=67$ for the non-player object 502b, and thus $G2=L2+\alpha D2=67+5\times10=117$ is obtained. That derives $G1>G2$ and the evaluation value of the non-player object 502b is smaller than that of the non-player object 502a. As a result, the non-player object 502b is selected as the target object.

Figure 20:
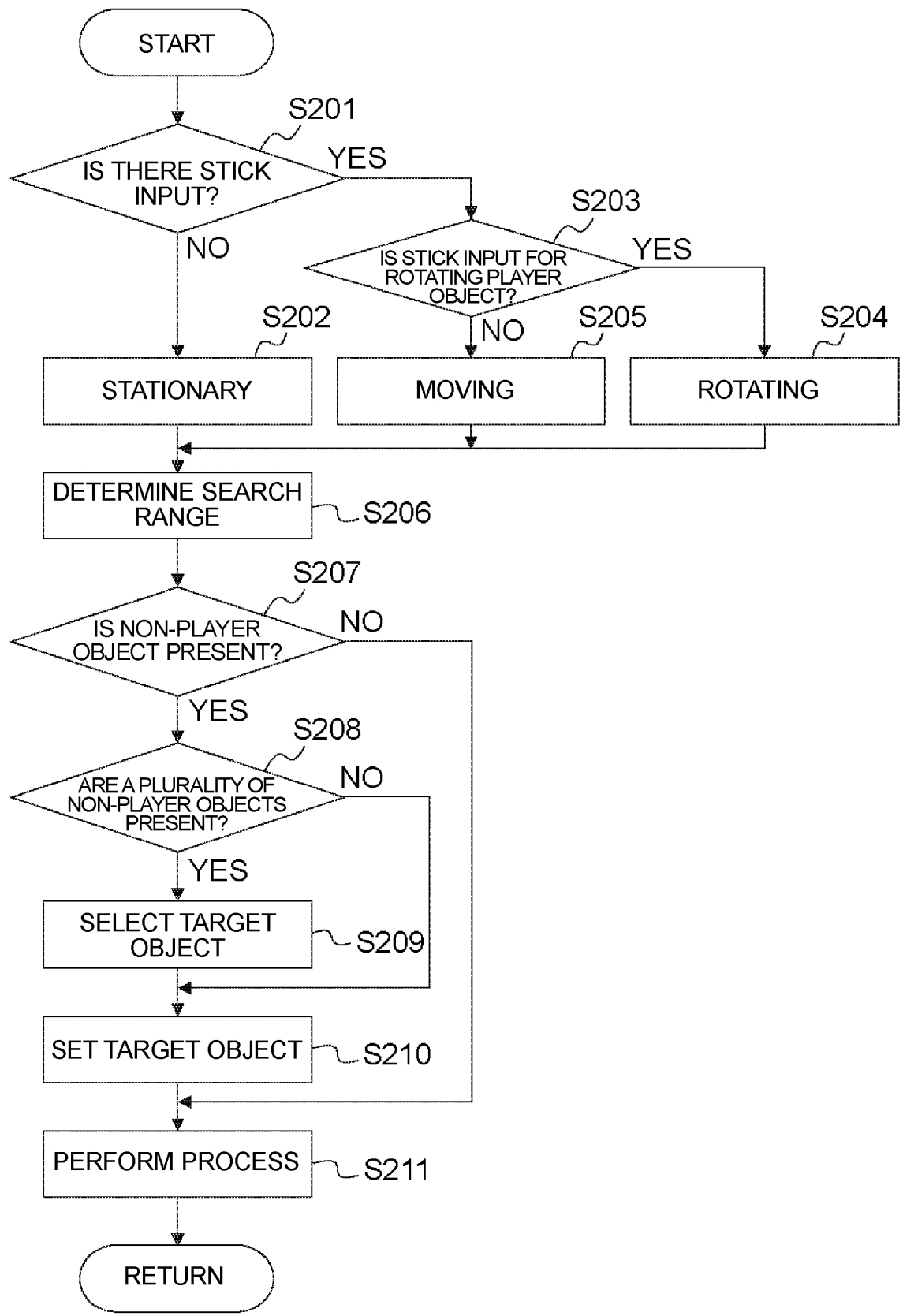
FIG. 20 is a flowchart of the player assist function in a game processing unit.

FIG. 20 is a flowchart of a player assist function in the game processing unit 72. The player object state determination unit 721 determines first the state of the player object 501. Specifically, the player object state determination unit 721 determines whether there is a stick input (step S201). In this case, whether there is a stick input is determined by determining whether the average value or the accumulated value of tilt amounts of a stick that are input in the past ten frames exceeds a predetermined threshold. The threshold in this case may be 0. When the threshold is 0, it is determined that there is a stick input even if a small stick input is made. When there is no stick input (NO at step S201), it is determined that the state of the player object 501 is "stationary" (step S202).

When there is a stick input (YES at step S201), it is determined that whether the stick input is for rotating the player object 501 (step S203). Also in this case, the player object state determination unit 721 determines whether the stick input is for rotating the player object 501 based on the magnitude of an input of a directional change (a change in directional input) in the past ten frames. When the change in directional input exceeds a predetermined threshold (YES at step S203), the player object state determination unit 721 determines that the state of the player object 501 is "rotating" (step S204). When the change in directional input does not exceed the predetermined threshold (NO at step S203), the player object state determination unit 721 determines that the state of the player object 501 is "moving". As described above, the change in directional input is obtained as the average value or the accumulated value not only in the present time but also in the past time. Consequently, if there is no movement input at the present time and thus the player object 501 is stationary, it may be determined that there is a change in directional input to the player object 501.

The search range determination unit 722 sets a search range based on the determination of the player object state determination unit 721 (step S206). At this time, the search range determination unit 722 increases the central angle of the search range 511 according to the magnitude of a change in directional input to the player object 501, as described above. When there is no movement input to the player object 501, the search range determination unit 722 determines the central angle in the range of 20 degrees at a minimum to 60 degrees at a maximum according to the magnitude of a change in directional input. When there is a movement input to the player object 501, the search range determination unit 722 determines the central angle in the range of 10 degrees at a minimum to 45 degrees at a maximum according to the magnitude of the movement input and the magnitude of a change in directional input.

Next, the target-object presence determination unit 723 determines whether the non-player object 502 is present in the search range 511 (step S207). When the non-player object 502 is present in the search range 511 (YES at step S207), the target-object presence determination unit 723 determines whether a plurality of the non-player objects 502 are present in the search range 511 (step S208).

When the non-player objects 502 are present in the search range 511 (YES at step S208), the target-object setting unit 724 uses the evaluation function G described above to select one of the non-player objects 502 (step S209), and sets the selected non-player object 502 as a target object (step S210). When one non-player object 502 is present in the search range 511 (NO at step S208), the target-object setting unit 724 sets the non-player object 502 as the target object (step S210).

The process performing unit 725 performs the cap throwing process (step S211). When the target object is set, the launch direction of the cap object 503 is a direction from the player object 501 toward the target object. When the non-player object 502 is not present in the search range 511 (NO at step S207), the launch direction of the cap object 503 is the front direction of the player object 501.

The game processing unit 72 may repeatedly perform processes from the determination of the state of the player object to setting of the target object (steps S201 to S210) while the player object 501 is present in a virtual space. When the player makes a predetermined input for the cap throwing process, the game processing unit 72 may perform the process to perform the cap throwing process (step S211). Alternatively, when the player makes a predetermined input for the cap throwing process, the game processing unit 72 may perform the processes from the determination of the state of the player object to the performance of the process (steps S201 to S211). Although not shown in FIG. 20, the screen rendering unit 726 generates a game screen that reflects a result of the process of the game processing unit 72 at a predetermined frame rate. The display unit 73 displays the game screen at a predetermined frame rate.

Figure 21:
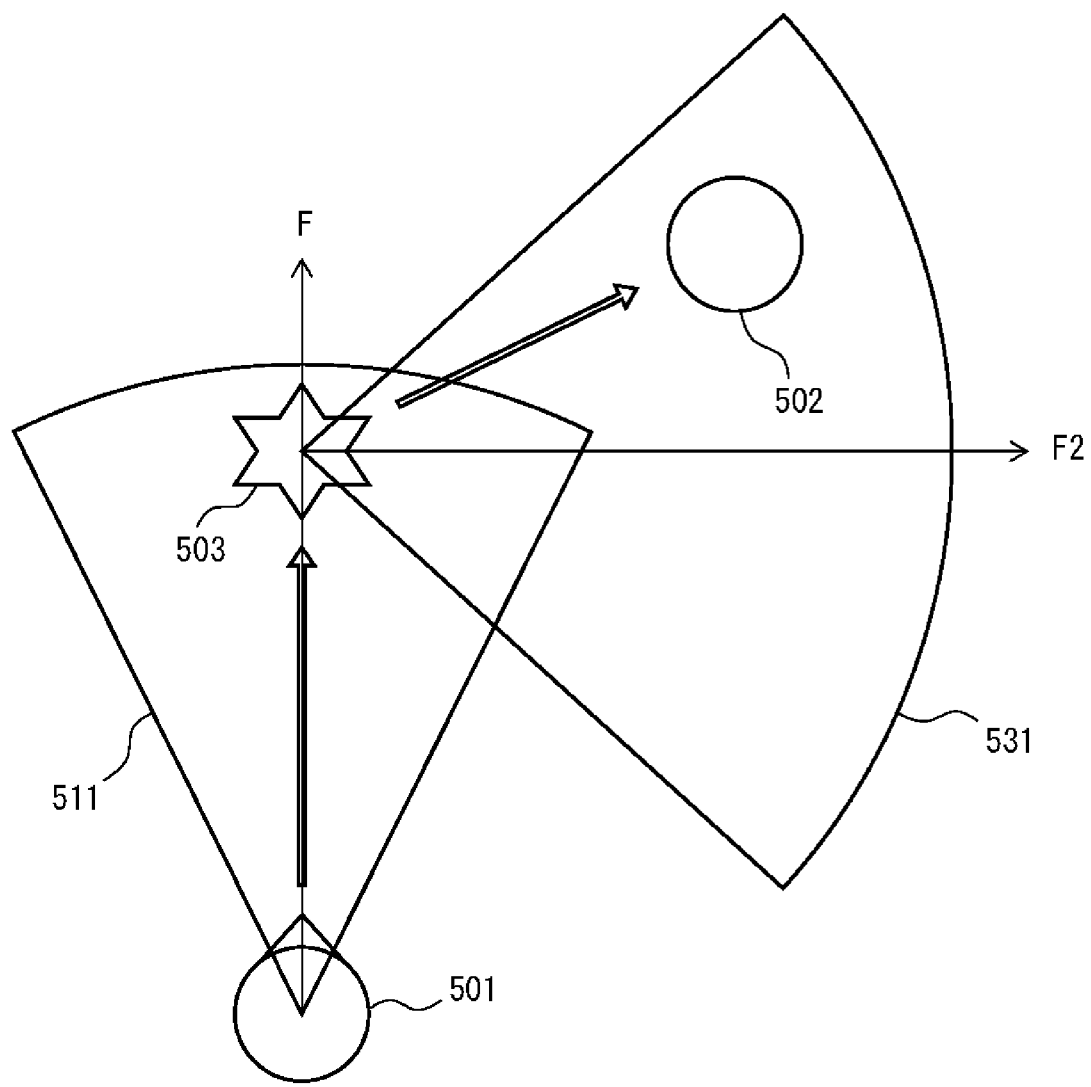
FIG. 21 is an explanatory diagram of setting of a search range in the course changing operation in the cap throwing process.

FIG. 21 is an explanatory diagram of setting of a search range in a course changing operation in a cap throwing process. As described above, when the player object 501 performs a cap throwing operation to launch the cap object 503 and then a player makes a predetermined input for the course changing operation (in the present embodiment, makes an input by shaking a right controller in a turn direction), the course of the flying cap object 503 can be changed to be turned in a direction of the shaking input.

When the course changing operation is performed, the search range determination unit 722 sets a second search range 531 in a turn direction. Specifically, the search range determination unit 722 sets the sector-shaped second search range 531 with a predetermined radius in which the center is at the cap object 503 immediately before turning and a course F2 after the change shown in FIG. 11 is a center line of the central angle. While the maximum central angle of a search range about the player object 501 is 60 degrees, the central angle of the second search range is larger than 60 degrees and is 85 degrees. While a fixed value is used for the central angle of the second search range 531 in the present embodiment, similarly to the search range 511, the size of the second search range 531 may be adjustable according to the state of the player object 501.

The following processes are similar to those for the search range 511. The target-object presence determination unit 723 determines whether the non-player object 502 is present in the second search range 531. When it is determined that the non-player object 502 is present in the second search range 531, the target-object setting unit 724 sets a target object. The process performing unit 725 performs a process of turning the cap object 503 toward the target object so that the cap object 503 hits the target object.

As described above, according to the game system 1 of the present embodiment, the player object 501 can launch the cap object 503 in the front direction in the cap throwing operation. At this time, it is possible to provide the player assist function in which the search range 511 is set for enabling the player object 501 to launch the cap object 503 and hit the cap object 503 on the non-player object 502.

In addition, according to the game system 1 of the present embodiment, the level of the player assist, that is, the size of the search range 511 is variable according to the state of the player object 501. Specifically, when the player object 501 is stationary, the search range 511 is set to be larger than that when the player object 501 is moving. This is because when a beginner tries to hit the cap object 503 on the non-player object 502 in the cap throwing operation, the beginner concentrates on hitting the cap object 503 on the non-player object 502, and thus the player object 501 is usually made to be stationary. For such a beginner, the search range 511 is set to be large for the purpose of increasing the level of the player assist.

Moreover, when the player object 501 is rotating, the search range 511 is set to be larger than that when the player object 501 is not rotating. This is because it is very difficult to hit the cap object 503 on the non-player object 502 while rotating the player object 501. When the player object 501 is rotating, the search range 511 is set to be large for the purpose of increasing the level of the player assist.

As the search range 511 is adjusted as described above, it is possible to prevent the difficulty from excessively increasing and to prevent enjoyment of game from decreasing by an excessive player assist.

While the search range 511 is a sector whose center is at the player object 501 in the embodiment described above, the shape of the search range 511 is not limited thereto. For example, the search range 511 may be a region constituted by the sector described above and a rectangular region with a predetermined width, extending from the player object 501 in the front direction of the player object 501, or may be regions with other shapes.

While the size of the search range 511 is adjusted by adjusting the central angle in the embodiment described above, instead thereof or in addition thereto, the size of the search range 511 may be adjusted by adjusting the radius of the sector.

While a description has been made on the cap throwing operation in which the player object 501 throws the cap object 503 in the above embodiment, the object launched from the player object is not limited to the cap object 503 and other operations other than throwing may be performed. For example, the technique of the present embodiment may be applied to an operation in which a player object kicks a ball object. In addition, a launched object (a cap object, a ball object, or the like) does not need to be launched from a player object.

In the embodiment described above, with the player assist function, the cap object 503 is launched not in the front direction of the player object 501 but in the direction toward the non-player object 502 in the search range 511. When the non-player object 502 is moving, the course of the launched cap object 503 may turn according to the movement of the non-player object 502. Alternatively, the movement of the non-player object 502 may be predicted in advance and then the cap object 503 may be launched to a predicted destination.

Moreover, while the above embodiment has described an example in which a virtual space is a three-dimensional space, the virtual space may be a two-dimensional space.

In addition, the above embodiment has described the search range 511 when viewing a three-dimensional space from above. In practice, the search range 511 may be a conical range or a pyramid range extending vertically. The search range 511 may be a circular range or a spherical range whose center is far away from a player.

In the embodiment described above, when a plurality of the non-player objects 502 are present in the search range 511, one of the non-player objects 502 is selected and set as a target object. Instead thereof, the non-player objects in the search range 511 may be set as the target object. In this case, for example, the cap object 503 may be thrown in a course of successively hitting the cap object 503 on the non-player objects in the ascending order of the evaluation value G. Alternatively, the cap object 503 may be thrown in a natural course of enabling the cap object 503 to pass through the target objects.

While the course changing operation of turning the course of the cap object 503 by a shaking input is performed in the embodiment described above, the course changing operation may be performed not only according to the shaking input but also according to a button operation.

In the embodiment described above, the size of the search range 511 is changed according to the state of a first object. Instead thereof or in addition thereto, the position or shape of the search range 511 may be changed.

Moreover, in the embodiment described above, the cap object 503 is linearly thrown toward a target object. Instead thereof, the cap object 503 may be thrown in a curved course.

What is claimed is:

1. A non-transitory computer readable storage medium storing an information processing program for controlling at least one processor, wherein the information processing program when executed by the at least one processor causes the at least one processor to:
    determine a state of a first object in a virtual space as being one of magnitude of: (a) a movement input to the first object, (b) a positional change of the first object, (c) a change in directional input to the first object, and (d) a directional change of the first object;
    determine a search range for searching for a second object based on a state of the first object, wherein the search range is continuously or discretely increased as the state of the first object is smaller, provided that the state of the first object is either (a) or (b), and wherein the search range is continuously or discretely increased as the state of the first object is larger, provided that the state of the first object is either (c) or (d);
    search for whether the second object is present in the search range; and
    set the second object as a target of predetermined information processing when it is determined that the second object is present in the search range.

2. The non-transitory computer readable storage medium according to claim 1, wherein the state of the first object is (a).

3. The non-transitory computer readable storage medium according to claim 1, wherein the state of the first object is (b).

4. The non-transitory computer readable storage medium according to claim 1, wherein the state of the first object is (c).

5. The non-transitory computer readable storage medium according to claim 1, wherein the state of the first object is (d).

6. The non-transitory computer readable storage medium according to claim 1, wherein the information processing program further causes the at least one processor to, when it is determined that a plurality of the second objects are present in the search range, set the second object that satisfies a predetermined condition as a target of the information processing.

7. A non-transitory computer readable storage medium storing an information processing program for controlling at least one processor, wherein the information processing program when executed by the at least one processor causes the at least one processor to:
    determine a state of a first object in a virtual space;
    determine a search range for searching for a second object based on a state of the first object;

search for whether the second object is present in the search range;

set the second object as a target of predetermined information processing when it is determined that the second object is present in the search range; and when it is determined that a plurality of the second objects are present in the search range, set the second object that satisfies a predetermined condition as a target of the information processing, wherein the predetermined condition is at least a condition based on whether a distance to an imaginary line extending in a front direction of the first object is short.

8. The non-transitory computer readable storage medium according to claim 1, wherein the information processing program further causes the at least one processor to determine the search range by using a position and a direction of the first object as a reference.

9. The non-transitory computer readable storage medium according to claim 8, wherein the search range is a sector in which a center is at the first object and a center line of a central angle is a front direction of the first object, and the information processing program further causes the at least one processor to determine the search range by determining at least one of the central angle of the sector and a radius of the sector based on a state of the first object.

10. The non-transitory computer readable storage medium according to claim 1, wherein the information processing program further causes the at least one processor to perform information processing of launching a third object from the first object to the target as the predetermined information processing.

11. The non-transitory computer readable storage medium according to claim 10, wherein the information processing program further causes the at least one processor to, when it is determined that the second object is not present in the search range, launch the third object in a front direction of the first object.

12. The non-transitory computer readable storage medium according to claim 1, wherein the first object is a player object that is operated by a player.

13. A non-transitory computer readable storage medium storing an information processing program for controlling at least one processor, wherein the information processing program when executed by the at least one processor causes the at least one processor to:

determine a state of a first object in a virtual space;

determine a search range for searching for a second object based on a state of the first object;

search for whether the second object is present in the search range;

set the second object as a target of predetermined information processing when it is determined that the second object is present in the search range; and when it is determined that an input for performing the predetermined information processing is made, determine the search range.

14. A non-transitory computer readable storage medium storing an information processing program for controlling at least one processor, wherein the information processing program when executed by the at least one processor causes the at least one processor to:

determine a state of a first object in a virtual space;

determine a search range for searching for a second object based on a state of the first object;

search for whether the second object is present in the search range;

set the second object as a target of predetermined information processing when it is determined that the second object is present in the search range, wherein launching a third object from the first object to the target is performed as the predetermined information processing; and when it is determined that an input for changing a course of the third object having been launched is made, set a position of the third object as a reference and determine the search range according to the input for changing the course.

15. A non-transitory computer readable storage medium storing an information processing program for controlling at least one processor, wherein the information processing program when executed by the at least one processor causes the at least one processor to:

determine a state of a first object in a virtual space, wherein the first object is a player object that is operated by a player;

determine a search range for searching for a second object based on a state of the first object;

search for whether the second object is present in the search range;

set the second object as a target of predetermined information processing when it is determined that the second object is present in the search range, wherein launching a third object from the first object to the target is performed as the predetermined information processing; and change an object functioning as a player object from the first object to the second object determined as the target after the predetermined information processing.

16. An information processing apparatus comprising at least one processor, the at least one processor configured to:

determine a state of a first object in a virtual space as being one of magnitude of: (a) a movement input to the first object, (b) a positional change of the first object, (c) a change in directional input to the first object, and (d) a directional change of the first object;

determine a search range for searching for a second object based on a state of the first object, wherein the search range is continuously or discretely increased as the state of the first object is smaller, provided that the state of the first object is either (a) or (b), and wherein the search range is continuously or discretely increased as the state of the first object is larger, provided that the state of the first object is either (c) or (d);

search for whether the second object is present in the search range; and set the second object as a target of predetermined information processing when it is determined that the second object is present in the search range.

17. The information processing apparatus according to claim 16, wherein the state of the first object is (a).

18. The information processing apparatus according to claim 16, wherein the state of the first object is (b).

19. The information processing apparatus according to claim 16, wherein the state of the first object is (c).

20. The information processing apparatus according to claim 16, wherein the state of the first object is (d).

21. An information processing method comprising:

determining a state of a first object in a virtual space as being one of magnitude of: (a) a movement input to the first object, (b) a positional change of the first object, (c) a change in directional input to the first object, and (d) a directional change of the first object;

determining a search range for searching for a second object based on a state of the first object, wherein the search range is continuously or discretely increased as the state of the first object is smaller, provided that the state of the first object is either (a) or (b), and wherein the search range is continuously or discretely increased as the state of the first object is larger, provided that the state of the first object is either (c) or (d);

searching for whether the second object is present in the search range; and setting the second object as a target of predetermined information processing when it is determined that the second object is present in the search range.

22. The information processing method according to claim 21, wherein the state of the first object is (a).

23. The information processing method according to claim 21, wherein the state of the first object is (b).

24. The information processing method according to claim 21, wherein the state of the first object is (c).

25. The information processing method according to claim 21, wherein the state of the first object is (d).

26. An information processing system comprising at least one processor, the at least one processor configured to:

determine a state of a first object in a virtual space as being one of magnitude of: (a) a movement input to the first object, (b) a positional change of the first object, (c) a change in directional input to the first object, and (d) a directional change of the first object;

determine a search range for searching for a second object based on a state of the first object, wherein the search range is continuously or discretely increased as the state of the first object is smaller, provided that the state of the first object is either (a) or (b), and wherein the search range is continuously or discretely increased as the state of the first object is larger, provided that the state of the first object is either (c) or (d);

search for whether the second object is present in the search range; and set the second object as a target of predetermined information processing when it is determined that the second object is present in the search range.

27. The information processing system according to claim 26, wherein the state of the first object is (a).

28. The information processing system according to claim 26, wherein the state of the first object is (b).

29. The information processing system according to claim 26, wherein the state of the first object is (c).

30. The information processing system according to claim 26, wherein the state of the first object is (d).

31. An information processing method comprising:

determining a state of a first object in a virtual space;

determining a search range for searching for a second object based on a state of the first object;

searching for whether the second object is present in the search range;

setting the second object as a target of predetermined information processing when it is determined that the second object is present in the search range; and when it is determined that an input for performing the predetermined information processing is made, determining the search range.

32. An information processing method comprising:

determining a state of a first object in a virtual space;

determining a search range for searching for a second object based on a state of the first object;

searching for whether the second object is present in the search range;

setting the second object as a target of predetermined information processing when it is determined that the second object is present in the search range, wherein launching a third object from the first object to the target is performed as the predetermined information processing; and when it is determined that an input for changing a course of the third object having been launched is made, setting a position of the third object as a reference and determining the search range according to the input for changing the course.

* * * * *